(12) United States Patent
Pham et al.

(10) Patent No.: US 8,450,421 B2
(45) Date of Patent: May 28, 2013

(54) CABLE LAYER OF MODIFIED SOFT POLYPROPYLENE WITH IMPROVED STRESS WHITENING RESISTANCE

(75) Inventors: Tung Pham, Linz (AT); Doris Machl, Mettmach (AT); Sybille Simon, Linz (AT); Katja Klimke, Linz (AT); Christer Svanberg, Kallered (SE); Thomas Steffl, Stenungsund (SE); David Friel, Linz (AT)

(73) Assignee: Borealis AG, Vienna (AT)

( * ) Notice: Subject to any disclaimer, the term of this patent is extended or adjusted under 35 U.S.C. 154(b) by 19 days.

(21) Appl. No.: 13/138,015

(22) PCT Filed: Dec. 17, 2009

(86) PCT No.: PCT/EP2009/067391
§ 371 (c)(1),
(2), (4) Date: Jun. 24, 2011

(87) PCT Pub. No.: WO2010/076231
PCT Pub. Date: Jul. 8, 2010

(65) Prior Publication Data
US 2011/0266027 A1    Nov. 3, 2011

(30) Foreign Application Priority Data
Dec. 29, 2008    (EP) .................... 08173001

(51) Int. Cl.
C08L 23/10 (2006.01)
C08L 23/16 (2006.01)
C08L 23/08 (2006.01)
H01B 3/00 (2006.01)

(52) U.S. Cl.
USPC ........... 525/191; 525/193; 525/194; 525/197; 525/198; 525/221; 525/222; 525/232; 525/240

(58) Field of Classification Search
USPC ................. 525/191, 193, 194, 197, 198, 221, 525/222, 232, 240
See application file for complete search history.

(56) References Cited

U.S. PATENT DOCUMENTS

| | | | |
|---|---|---|---|
| 2,897,183 A | 7/1959 | Christl et al. | |
| 3,350,372 A | 10/1967 | Anspon et al. | |
| 3,756,996 A | 9/1973 | Pugh et al. | |
| 4,107,414 A | 8/1978 | Giannini et al. | |
| 4,186,107 A | 1/1980 | Wagner | |
| 4,226,963 A | 10/1980 | Giannini et al. | |
| 4,347,160 A | 8/1982 | Epstein et al. | |
| 4,382,019 A | 5/1983 | Greco | |
| 4,435,550 A | 3/1984 | Ueno et al. | |
| 4,465,782 A | 8/1984 | McKenzie | |
| 4,472,524 A | 9/1984 | Albizzati | |
| 4,473,660 A | 9/1984 | Albizzati et al. | |
| 4,522,930 A | 6/1985 | Albizzati et al. | |
| 4,530,912 A | 7/1985 | Pullukat et al. | |
| 4,532,313 A | 7/1985 | Matlack | |
| 4,560,671 A | 12/1985 | Gross et al. | |
| 4,581,342 A | 4/1986 | Johnson et al. | |
| 4,657,882 A | 4/1987 | Karayannis et al. | |
| 5,028,674 A | 7/1991 | Hatch et al. | |
| 5,532,066 A | 7/1996 | Latiolais et al. | |
| 5,539,067 A | 7/1996 | Parodi et al. | |
| 5,618,771 A | 4/1997 | Parodi et al. | |
| 6,242,525 B1 * | 6/2001 | Raetzsch et al. | ............. 524/525 |
| 2010/0022715 A1 * | 1/2010 | Grein et al. | ................. 525/221 |

FOREIGN PATENT DOCUMENTS

| | | |
|---|---|---|
| EP | 0045975 A2 | 2/1982 |
| EP | 0045976 A2 | 2/1982 |
| EP | 0045977 A2 | 2/1982 |
| EP | 0316187 A2 | 5/1989 |
| EP | 0893801 A1 | 1/1999 |
| EP | 1619217 A1 | 1/2006 |
| EP | 1847565 A1 | 10/2007 |
| WO | 8707620 A1 | 12/1987 |
| WO | 9219653 A1 | 11/1992 |
| WO | 9219658 A1 | 11/1992 |
| WO | 9219659 A1 | 11/1992 |
| WO | 9221705 A1 | 12/1992 |
| WO | 9311165 A1 | 6/1993 |
| WO | 9311166 A1 | 6/1993 |
| WO | 9319100 A1 | 9/1993 |
| WO | 9532994 A1 | 12/1995 |
| WO | 9736939 A1 | 10/1997 |
| WO | 9924479 A1 | 5/1999 |
| WO | 9933842 A1 | 7/1999 |
| WO | 0300754 A1 | 1/2003 |
| WO | 0300755 A2 | 1/2003 |
| WO | 0300756 A1 | 1/2003 |
| WO | 0300757 A1 | 1/2003 |
| WO | 2004029112 A1 | 4/2004 |

OTHER PUBLICATIONS

Richard T. Chou et al., High Flexibility EMA made from High Pressure Tubular Process, 2002, pp. 1832-18183, vol. 2, Annual Technical Conference—Society of Plastics Engineers.

(Continued)

*Primary Examiner* — Nathan M Nutter
(74) *Attorney, Agent, or Firm* — Warn Partners, P.C.

(57) ABSTRACT

Cable layer comprising a propylene polymer composition comprising (a) a polypropylene (A) (b) an elastomeric copolymer (E) comprising units derived from propylene and ethylene and/or C4 to C20 α-olefin and (c) a polar ethylene polymer (C) wherein the cable layer and/or the propylene polymer composition has a gel content of equal or more than 0.20 wt.-%.

25 Claims, 4 Drawing Sheets

OTHER PUBLICATIONS

S. Berger et al., 200 and more NMR Experiments: A Practical Course, 2004, Wiley-VCH, Weinheim.

A. J. Brandolini et al., NMR Spectra of Polymers and Polymer Additives, 2000, Marcel Dekker Inc., New York.

M. Sentmanat et al., Measuring the Transient Extensional Rheology of Polyethylene Melts using the SER Universal Testing Platform, 2005, pp. 585-606, J. Rheol.

Udo M. Wahner et al., C NMR Study of Copolymers of Propene with Higher 1-Olefins with New Microstructures by ansa-Zirconocene Catalysts, Jul. 14, 2003, pp. 1738-1746, 204, No. 14, Wiley-V H Verlag GmbH & Co. KGaA, Weinheim.

International Search Report and Written Opinion for Application No. PCT/EP2009/067391; Filed Apr. 16, 2010.

* cited by examiner

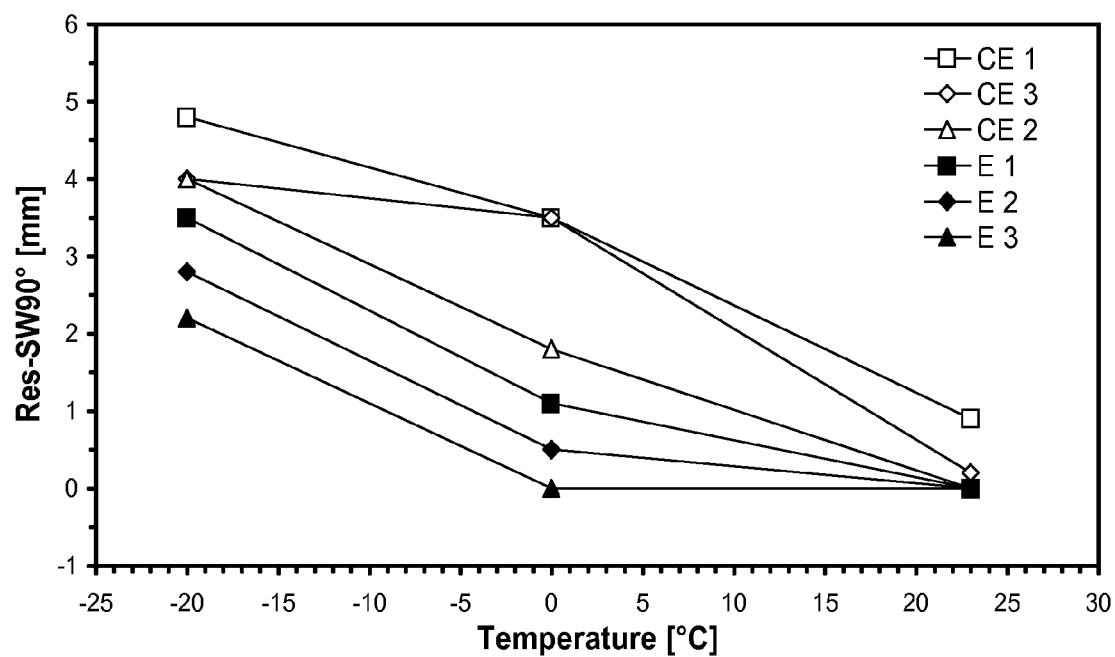
Figure 1: Temperature dependence of Res-SW90 °

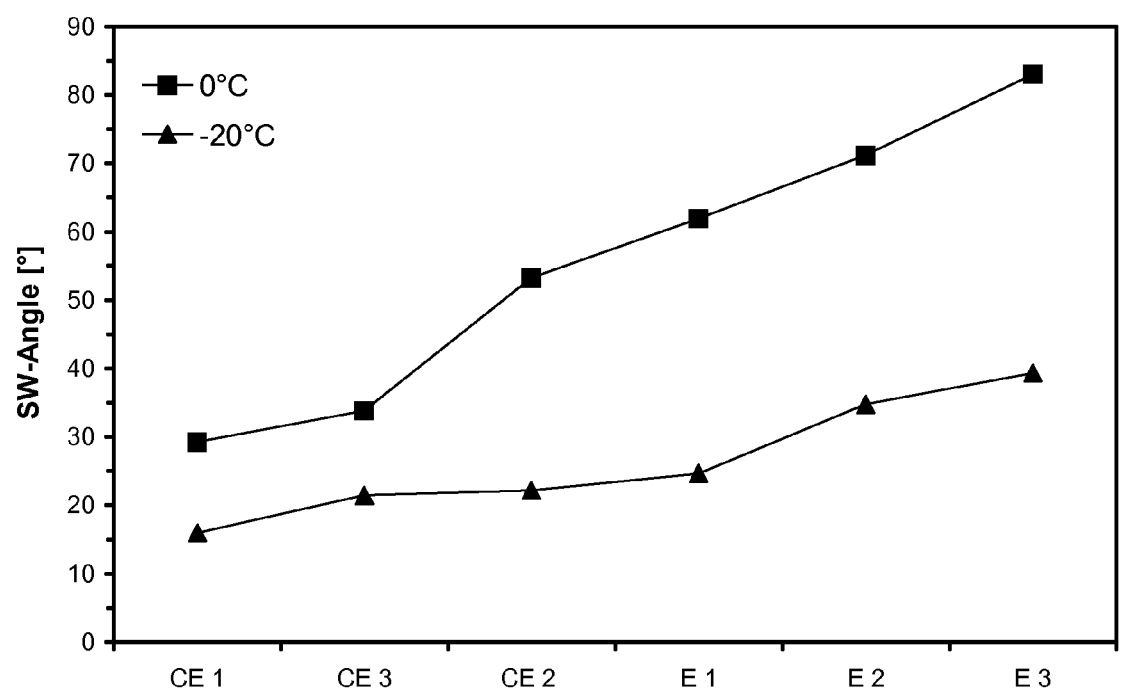
Figure 2: Temperature dependence of SW-angle

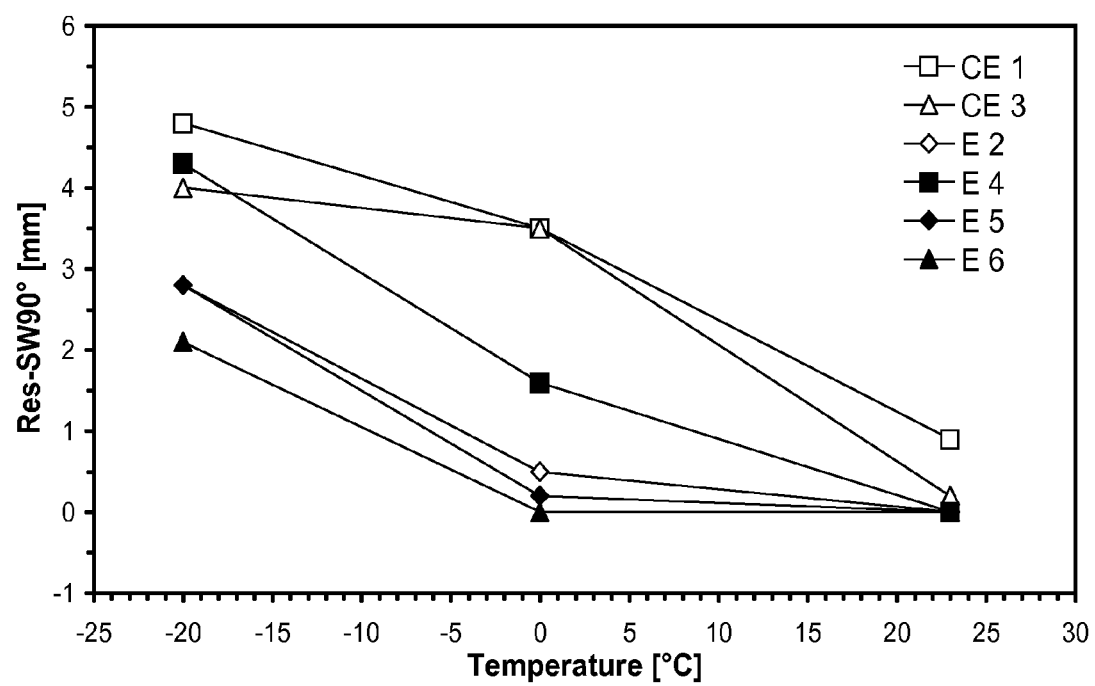
Figure 3: Temperature dependence of Res-SW90

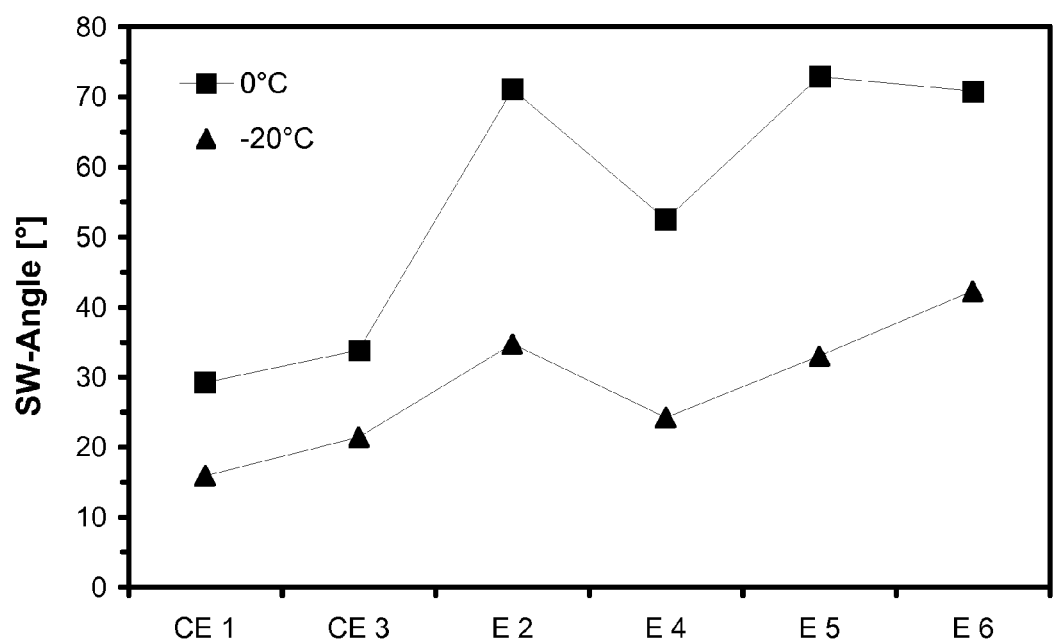
Figure 4: Temperature dependence of SW-angle

CABLE LAYER OF MODIFIED SOFT POLYPROPYLENE WITH IMPROVED STRESS WHITENING RESISTANCE

This application is a National Stage of International Application No. PCT/EP2009/067391, filed Dec. 17, 2009. This application claims priority to European Patent Application No. 08173001.2, filed on Dec. 29, 2008. The disclosures of the above applications are incorporated herein by reference.

The present invention relates to a new cable layer of polypropylene as well as to its use and to cables comprising said new cable layer.

Today, polyethylene is used as the material of choice for the insulative and semiconductive layers in power cables due to the ease of processing and the beneficial electrical properties. In order to assure good operating properties at the required operating temperature (90° C.) the polymers are crosslinked. A drawback of such crosslinked polyethylene materials is the remaining crystalline fraction of the polyethylene which melts at about 110° C. This means that at the emergency temperature (~135° C.) the material might create some problems. Another drawback is the lack of recyclability of such crosslinked insulation materials.

Nowadays attempts are undertaken to replace known cable layers based on polyethylene by cable layers based on polypropylene. Various polypropylene types have been suggested tailored for individual purposes.

For instance EP 1 619 217 A1 provides a cable layer of a heterophasic propylene polymer with good results with regard to softness and toughness, even though the toughness at low temperatures could be still improved. However, the polymer cannot be extruded at high line speeds. High line speeds, however, are highly appreciated from a commercial point of view.

EP 0 893 801 A1 discloses propylene polymer components suitable as insulation sheet material. It particularly discloses a composition of a crystalline propylene homopolymer or copolymer mixed with a copolymer of ethylene with an α-olefin having a low density and a high structural uniformity, in particular having a highly homogeneous distribution of the α-olefin between the polymer molecules. However, EP 0 893 801 A1 does not disclose a possibility of having an insulation layer suitable for high temperature operation conditions, while simultaneously having very good mechanical and process properties.

Further there are environmentally friendly insulation layers known allowing an operating temperature of at least 90° C. and having enhanced mechanical properties, like high impact strength. However such type of polypropylene exhibits a property known as stress whitening. Hence, when such polymers are bent or impacted, the bending or impact zone turns to an opaque milky color even if the polymer is colored. Therefore, mostly, polyethylene is added to the composition in order to improve the stress whitening resistance. The stress whitening resistance even occurs also in pigmented polypropylene compositions. Obviously, stress whitening is a non-desired effect and in a cable application it occurs e.g. during coiling at installation. The lower the temperature, the more pronounced the stress whitening effect becomes. The effect is seen as a potential killer variable to any attempts to introduce a polypropylene concept for power cables.

Thus there is still the need for new cable layers based on polypropylene. There is in particular the need for cable layers with very good stress whitening resistance at low temperatures, i.e. at −20° C., paired with a very high toughness at low temperatures and optionally a high temperature performance, in terms of heat deformation resistance.

Thus the object of the present invention is to provide a cable layer with good stress whitening resistance at low temperatures, i.e. at −20° C., by keeping the mechanical properties on an outstanding level. Accordingly it is sought for a cable layer having a good stress whitening resistance at low temperatures and a high toughness in particular at low temperatures. Additionally it is appreciated that the cable layer features high flexibility in terms of tensile modulus. Moreover it is appreciated that the cable layer shows an excellent temperature performance, i.e. a high heat deformation resistance. Additionally the new cable layers shall be obtained by high output rates, i.e. the thermoplastic extrusion speed to assess the cable application must be satisfactorily high. Further the polymer material shall preferably withstand high cable operating temperatures.

The finding of the present invention is to provide a cable layer comprising a heterophasic propylene copolymer and a polar ethylene polymer wherein at least the heterophasic propylene copolymer has been chemically modified by at least bifunctionally unsaturated compounds.

Thus the present invention provides a cable layer comprising a propylene polymer composition comprising
(a) a polypropylene (A),
(b) an elastomeric copolymer (E) comprising units derived from
propylene and
ethylene and/or C4 to C20 α-olefin, and
(c) a polar ethylene polymer (C),
wherein the cable layer and/or the propylene polymer composition has
(i) a gel content of equal or more than 0.20 wt.-% and/or
(ii) a strain hardening $SH_{3.0/2.5}$ (at a Hencky strain rate of 3 $s^{-1}$) of at least 0.5 and/or
(iii) a branching index g' of below 1.0.

It comes obvious from the description of this invention that the polypropylene (A) and the elastomeric copolymer (E) are chemically. Thus in a preferred embodiment, as described in more detail below, the polypropylene (A) is matrix in which at least the elastomeric copolymer is dispersed. Therefore the propylene polymer composition according to this invention is preferably a heterophasic system.

Preferably the gel content and/or the strain hardening and/or the branching index g' is(are) achieved by a chemical modification of the propylene polymer composition. More preferably the propylene polymer composition comprises, in addition to the components (A), (E) and (C), units (D) derived from (at least) bifunctionally unsaturated monomer(s) (D') and/or (at least) multifunctionally unsaturated low molecular weight polymer(s) (D"). Said units (D) are preferably chemically bound branching units and/or bridging units, i.e. units linked to at least one of the polymers (A) and/or (E). Even more preferred (at least) the bifunctionally unsaturated monomer(s) (D') and/or (at least) the multifunctionally unsaturated low molecular weight polymer(s) (D") are linked to the polymers (A), (E) and (C). It is in particular appreciated that the chemical modification is accomplished by using thermally decomposing free radical-forming agents.

Accordingly, in a first embodiment the present invention provides a cable layer comprising a propylene polymer composition comprising
(a) a polypropylene (A),
(b) an elastomeric copolymer (E) comprising units derived from
propylene and
ethylene and/or C4 to C20 α-olefin, and (c) a polar ethylene polymer (C),
wherein
(i) the polypropylene (A) and/or the elastomeric copolymer (E) but not the polar ethylene polymer (C) is(are) chemically modified due to the bifunctionally unsaturated monomer(s) (D') and/or the multifunctionally unsaturated low molecular weight polymer(s) (D"), and
(ii) the cable layer and/or the propylene polymer composition has(have)
(α) a gel content of equal or more than 0.20 wt.-% and/or
(β) a strain hardening $SH_{3.0/2.5}$ (at a Hencky strain rate of 3 $s^{-1}$) of at least 0.5 and/or
(γ) a branching index g' of below 1.0.

In a second embodiment the present invention provides a cable layer comprising a propylene polymer composition comprising
(a) a polypropylene (A),
(b) an elastomeric copolymer (E) comprising units derived from
  propylene and
  ethylene and/or C4 to C20 α-olefin, and
(c) a polar ethylene polymer (C),
wherein
(i) the polypropylene (A), the elastomeric copolymer (E) and the polar ethylene polymer (C) are chemically modified due to the bifunctionally unsaturated monomer(s) (D') and/or the multifunctionally unsaturated low molecular weight polymer(s) (D"), and
(ii) the cable layer and/or the propylene polymer composition has(have)
(α) a gel content of equal or more than 0.20 wt.-% and/or
(β) a strain hardening $SH_{3.0/2.5}$ (at a Hencky strain rate of 3 $s^{-1}$) of at least 0.5 and/or
(γ) a branching index g' of below 1.0.

Surprisingly it has been found that the cable layer and/or the propylene polymer composition of the cable layer as defined above has/have superior properties compared with products known in the art (see table 1 to 4). For instance the cable layer and/or the propylene polymer composition has (have) a very low tensile modulus. On the other hand the impact strength is significantly improved compared to an unmodified heterophasic polypropylene. Very importantly the stress whitening resistance is significantly improved compared to known heterophasic polypropylene systems. Also the melt strength performance of the inventive propylene polymer composition is excellent. The positive effects, in particular the very low tensile modulus, the high impact strength (in particular at low temperatures) and stress whitening resistance can only be accomplished in case of the propylene polymer composition (based on polypropylene (A) and the elastomeric copolymer (E)) is modified by adding the polar ethylene polymer (C) and chemically modifying said composition by at least bifunctionally unsaturated compounds.

A further finding of the present invention is that in case the above defined embodiments are additionally α-nucleated a further improvement of properties is accomplished.

Thus the present invention especially provides a cable layer comprising a propylene polymer composition comprising
(a) a polypropylene (A),
(b) an elastomeric copolymer (E) comprising units derived from
  propylene and
  ethylene and/or C4 to C20 α-olefin, and
(c) a polar ethylene polymer (C),
wherein the cable layer and/or the propylene polymer composition is(are) α-nucleated and wherein further the cable layer and/or the propylene polymer composition has(have)
(i) a gel content of equal or more than 0.20 wt.-% and/or
(ii) strain hardening $SH_{3.0/2.5}$ (at a Hencky strain rate of 3 $s^{-1}$) of at least 0.5 and/or
(iii) a branching index g' of below 1.0.

The gel content and/or the strain hardening and/or the branching index g' is(are) achieved by a chemical modification of the propylene polymer composition. More preferably the propylene polymer composition comprises, in addition to the components (A), (E) and (C), units (D) derived from (at least) bifunctionally unsaturated monomer(s) (D') and/or (at least) multifunctionally unsaturated low molecular weight polymer(s) (D"). Said units (D) are preferably chemically bound branching units and/or bridging units, i.e. units linked to at least one of the polymers (A) and/or (E). Even more preferred (at least) the bifunctionally unsaturated monomer(s) (D') and/or (at least) the multifunctionally unsaturated low molecular weight polymer(s) (D") are linked to the polymers (A), (E) and (C). It is in particular appreciated that the chemical modification is accomplished by using thermally decomposing free radical-forming agents. Further the α-nucleation is preferably accomplished by the use of α-nucleating agents. Thus it is appreciated that the cable layer and/or the propylene polymer composition comprises additionally α-nucleating agents.

Therefore in a third embodiment the present invention is directed to a cable layer comprising a propylene polymer composition comprising
(a) a polypropylene (A),
(b) an elastomeric copolymer (E) comprising units derived from
  propylene and
  ethylene and/or C4 to C20 α-olefin, and
(c) a polar ethylene polymer (C),
wherein
(i) the polypropylene (A) and/or the elastomeric copolymer (E) but not the polar ethylene polymer (C) is(are) chemically modified due to the bifunctionally unsaturated monomer(s) (D') and/or the multifunctionally unsaturated low molecular weight polymer(s) (D"), and
(ii) the cable layer and/or the propylene polymer composition has(have)
(α) a gel content of equal or more than 0.20 wt.-% and/or
(β) a strain hardening $SH_{3.0/2.5}$ (at a Hencky strain rate of 3 $s^{-1}$) of at least 0.5, and/or
(γ) a branching index g' of below 1.0 and
wherein further the cable layer and/or the propylene polymer composition is(are) α-nucleated.

Finally, in a fourth embodiment the present invention provides a cable layer comprising a propylene polymer composition comprising
(a) a polypropylene (A),
(b) an elastomeric copolymer (E) comprising units derived from
  propylene and
  ethylene and/or C4 to C20 α-olefin, and
(c) a polar ethylene polymer (C),
wherein
(i) the polypropylene (A), the elastomeric copolymer (E) and the polar ethylene polymer (C) are chemically modified due to the bifunctionally unsaturated monomer(s) (D') and/or the multifunctionally unsaturated low molecular weight polymer(s) (D"), and (ii) the cable layer and/or the propylene polymer composition has(have)
   (α) a gel content of equal or more than 0.20 wt.-% and/or
   (β) a strain hardening $SH_{3.0/2.5}$ (at a Hencky strain rate of 3 s$^{-1}$) of at least 0.5, and/or
   (γ) a branching index g' of below 1.0 and
wherein further the cable layer and/or the propylene polymer composition is(are) α-nucleated.

In comparison to the first and second embodiment, the third and fourth embodiments are additionally improved in view of high cable operating temperatures due to the significantly increased crystallization and melting temperatures (see table 5). Additionally the elongation at break is enhanced without impact loss.

BRIEF DESCRIPTION OF DRAWINGS

FIG. 1 is a chart depicting temperature dependence of Res-SW90°;

FIG. 2 is a chart depicting temperature dependence of SW-angle;

FIG. 3 is a chart depicting temperature dependence of Res-SW90; and

FIG. 4 is a chart depicting temperature dependence of SW-angle.

The invention as defined above (the first, second, third and fourth embodiment) is now described in more detail.

The term cable layer according to this invention is understood as any layer suitable in cables, like power cables. Preferably however the cable layer according to this invention is a cable insulation layer.

Preferably the propylene polymer composition of the cable layer and/or the cable layer does/do not comprise further polymers, i.e. propylene polymer (A), the elastomeric copolymer (E), the polar ethylene polymer (C) and optionally the multifunctionally unsaturated low molecular weight polymers (D") and low amounts of crystalline polyethylene, i.e. not more than 5 wt.-%, are the only polymers within the propylene polymer composition and/or the cable layer.

To obtain especially good results the polymer components may be present in specific amounts. Thus it is preferred that the cable layer and/or the propylene polymer composition according to the instant invention comprises
(a) at least 36.0 wt.-%, i.e. 36.0 to 70.0 wt.-%, preferably 36.0 to 65.0 wt.-%, more preferably 40.0 to 60.0 wt.-% and yet more preferably about 50.0 wt.-%, i.e. 45.0 to 52.0 wt.-%, of polypropylene (A),
(b) not more than 50.0 wt.-%, i.e. 10.0 to 50.0 wt.-%, preferably 15.0 to 45.0 wt.-%, still more preferably 15.0 to 40.0 wt.-%, yet more preferably 20.0 to 35.0 wt.-%, of the elastomeric copolymer (E), and
(c) at least 10.0 wt.-%, i.e. 10.0 to 35.0 wt.-%, preferably 12.0 to 33.0 wt.-%, more preferably 15.0 to 31.0 wt.-%, yet more preferably 18.0 to 31.0 wt.-%, of the polar ethylene polymer (C),
wherein the percentages are based on the total amount of the cable layer and/or the propylene polymer composition, preferably based on the sum of the polypropylene (A), the elastomeric copolymer (E) and the polar ethylene polymer (C).

In case the propylene polymer composition is modified, the modification is preferably accomplished by (at least) bifunctionally unsaturated monomer(s) (D') and/or (at least) multifunctionally unsaturated low molecular weight polymer(s) (D"). It is even more preferred that said monomer(s) (D') and/or polymer(s) (D") react to chemically bound branching units(s) and/or bridging unit(s) (D), i.e. to units linked to at least one of the components (A) and/or (E) or even more preferably to units linked to the components (A), (E) and (C).

A preferred amount of the bifunctionally unsaturated monomer(s) (D') and/or multifunctionally unsaturated low molecular weight polymer(s) (D") present in the propylene polymer composition is in the range of 0.03 to 10.0 wt.-%, preferably in the range of 0.03 to 5.0 wt.-%, more preferably in the range of 0.03 to 3.0 wt.-%, still more preferably in the range of 0.03 to 1.5 wt-% based on the total amount of said cable layer and/or said propylene polymer composition, preferably based on the sum of the polypropylene (A), elastomeric copolymer (E), polar ethylene polymer (C) and bifunctionally unsaturated monomer(s) (D') and/or multifunctionally unsaturated low molecular weight polymer(s) (D").

The thermally decomposing free radical-forming agent, if used, is preferably in the range of 0.05 to 3.00 wt.-% based on the cable layer and/or the propylene polymer composition.

Thus the propylene polymer (A), the elastomeric copolymer (E) and the polar ethylene polymer (C) together constitute preferably at least 85 wt.-%, i.e. preferably 85 to 99.9 wt.-%, more preferably at least 90 wt.-%, i.e. 90.0 to 99.9 wt.-%, more preferably 95.0 to 99.9 wt.-%, still more preferably 97.0 to 99.9 wt.-% of the cable layer and/or the propylene polymer composition, more preferably based on the sum of the propylene polymer (A), the elastomeric copolymer (E), the polar ethylene polymer (C) and the bifunctionally unsaturated monomer(s) (D') and/or the multifunctionally unsaturated low molecular weight polymer(s) (D") together.

In a preferred embodiment at least the polypropylene (A) and the elastomeric copolymer (E) are an intimate mixture. Thus the instant cable layer comprises a propylene polymer composition, said propylene polymer composition comprises
(a) a heterophasic propylene copolymer (H) comprising
   (i) the polypropylene (A) as a matrix,
   (ii) the elastomeric copolymer (E) as an amorphous part dispersed in said matrix,
   (iii) optionally a crystalline polyethylene,
and
(b) polar ethylene polymer (C),
wherein the propylene polymer composition has
(i) a gel content of equal or more than 0.20 wt.-% and/or
(ii) a strain hardening $SH_{3.0/2.5}$ (at a Hencky strain rate of 3 s$^{-1}$) of at least 0.5, and/or
(iii) a branching index g' of below 1.0 and
optionally the cable layer and/or the propylene polymer composition of the previous paragraph is(are) α-nucleated, more preferably the cable layer and/or the propylene polymer composition of the previous paragraph comprise(s) additionally at least one, preferably one, α-nucleating agent.

Even more preferred said composition comprising the heterophasic propylene copolymer (H) and the polar ethylene polymer (C) is modified due to unit(s) (D) derived from (at least) bifunctionally unsaturated monomer(s) (D') and/or (at least) multifunctionally unsaturated low molecular weight polymer(s) (D"). In particular said composition is modified due to chemically bound branching units and/or bridging unit(s) (D) derived from (at least) bifunctionally unsaturated monomer(s) (D') and/or (at least) multifunctionally unsaturated low molecular weight polymer(s) (D") wherein said units (D) are preferably linked to the compounds (A) and/or (E), even more preferably linked to the compounds (A), (E) and (C). As stated above the modification can be supported by a thermally decomposing free radical-forming agent, preferably in the amount as given above.

Accordingly two different embodiments are in particular appreciated:

FIRST EMBODIMENT

A cable layer comprising a propylene polymer composition comprising
(a) a heterophasic propylene copolymer (H) comprising
  (i) the polypropylene (A) as a matrix
  (ii) the elastomeric copolymer (E) as an amorphous part dispersed in said matrix,
  (iii) optionally a crystalline polyethylene,
and
(b) a polar ethylene polymer (C),
wherein
(i) the heterophasic propylene copolymer (H) but not the polar ethylene polymer (C) is chemically modified due to the bifunctionally unsaturated monomer(s) (D') and/or the multifunctionally unsaturated low molecular weight polymer(s) (D"), and
(ii) the cable layer and/or the propylene polymer composition has
  (α) a gel content of equal or more than 0.20 wt.-% and/or
  (β) a strain hardening $SH_{3.0/2.5}$ (at a Hencky strain rate of 3 $s^{-1}$) of at least 0.5, and/or
  (γ) a branching index g' of below 1.0 and
wherein further the cable layer and/or the propylene polymer composition is(are) optionally α-nucleated.

SECOND EMBODIMENT

A cable layer comprising a propylene polymer composition comprising
(a) a heterophasic propylene copolymer (H) comprising
  (i) the polypropylene (A) as a matrix,
  (ii) the elastomeric copolymer (E) as an amorphous part dispersed in said matrix,
  (iii) optionally a crystalline polyethylene,
and
(b) a polar ethylene polymer (C),
wherein
(i) heterophasic propylene copolymer (H) and the polar ethylene polymer (C) is chemically modified due to the bifunctionally unsaturated monomer(s) (D') and/or the multifunctionally unsaturated low molecular weight polymer(s) (D"), and
(ii) the cable layer and/or the propylene polymer composition has
  (α) a gel content of equal or more than 0.20 wt.-% and/or
  (β) a strain hardening $SH_{3.0/2.5}$ (at a Hencky strain rate of 3 $s^{-1}$) of at least 0.5, and/or
  (γ) a branching index g' of below 1.0 and
wherein further the cable layer and/or the propylene polymer composition is(are) optionally α-nucleated.

The heterophasic propylene copolymer (H) is preferably obtained by carrying out an at least two stage process resulting in a multiphase structure with a polypropylene matrix (A) and inclusions therein comprising the elastomeric copolymer (E) as a part of the amorphous phase. The exact method to produce such a heterophasic propylene copolymer (H) is defined in detail below.

In case the propylene polymer composition comprises such a heterophasic propylene copolymer (H) the cable layer and/or the polypropylene composition comprises preferably
(a) at least 60.0 wt.-%, preferably 60.0 to 90.0 wt.-%, more preferably 65.0 to 88.0 wt.-%, yet more preferably 67.0 to 85.0 wt.-% of a heterophasic propylene copolymer (H) based on the total amount of propylene polymer composition, preferably on the sum of the heterophasic propylene copolymer (H) and the polar ethylene polymer (C), comprising
  (i) at least 40.0 wt.-%, preferably 50.0 to 80.0 wt.-%, more preferably 65 to 75.0 wt.-%, yet more preferably 58.0 to 73.0 wt.-% of polypropylene (A) based on the total amount of the heterophasic propylene copolymer (H)
  (ii) not more than 60.0 wt.-%, preferably 20.0 to 50.0 wt.-%, more preferably 25.0 to 45.0 wt.-%, yet more preferably 27.0 to 42.0 wt.-% of the elastomeric copolymer (E) based on the total amount of the heterophasic propylene copolymer (H), more preferably based on the polypropylene (A) and the elastomeric copolymer (E),
(b) at least 10.0 wt.-%, preferably 10.0 to 35.0 wt.-%, more preferably 12.0 to 33.0 wt.-%, yet more preferably 15.0 to 31.0 wt.-% of the polar ethylene polymer (C) based on the total amount of the cable layer and/or the total amount of the propylene polymer composition, preferably based on the sum of the heterophasic propylene copolymer (H) and the polar ethylene polymer (C), yet more preferably based on the sum of the polypropylene (A), the elastomeric copolymer (E) and the polar ethylene polymer (C),
(c) optionally of 0.03 to 10.0 wt.-%, preferably 0.03 to 5.0 wt.-%, more preferably 0.03 to 3.0 wt.-%, still more preferably 0.03 to 1.5 wt.-% bifunctionally unsaturated monomer(s) (D') and/or multifunctionally unsaturated low molecular weight polymer(s) (D") preferably as chemically bound branching units and/or bridging unit(s) (D) based on the total amount of the cable layer and/or the propylene polymer composition, preferably based on the sum of the polypropylene (A), elastomeric copolymer (E), polar ethylene polymer (C) and bifunctionally unsaturated monomer(s) (D') and/or multifunctionally unsaturated low molecular weight polymer(s) (D").

Preferably in such a cable layer and/or in such a propylene polymer composition as defined in the previous paragraph the amount of the elastomeric copolymer (E) is at least 15.0 wt.-%, like at least 18.0 wt.-%, based on the total amount of the cable layer and/or the propylene polymer composition, preferably based on the sum of the polypropylene (A), elastomeric copolymer (E), polar ethylene polymer (C) and bifunctionally unsaturated monomer(s) (D') and/or multifunctionally unsaturated low molecular weight polymer(s) (D").

But not only the elastomeric copolymer (E) can be dispersed in the polypropylene (A), which constitutes the matrix of the heterophasic propylene copolymer (H), but also the polar ethylene polymer (C), when mixed with the heterophasic propylene copolymer (H).

In any case, if units (D), i.e. bifunctionally unsaturated monomer(s) (D') and/or multifunctionally unsaturated low molecular weight polymer(s) (D"), are present in the propylene composition the amount of compounds (A), (E) and (C) together is preferably in the range of 90.0 to 99.9 wt.-%, more preferably in the range of 95.0 to 99.1 wt.-%, still more preferably in the range of 97.0 to 99.1 wt.-% based on the total amount of the propylene polymer composition, preferably based on the sum of the polypropylene (A), elastomeric copolymer (E), polar ethylene polymer (C) and bifunctionally unsaturated monomer(s) (D') and/or multifunctionally unsaturated low molecular weight polymer(s) (D").

The thermally decomposing free radical-forming agent, if used, is preferably in the range of 0.05 to 3.00 wt.-% based on the propylene polymer composition, preferably based on the sum of the thermally decomposing free radical-forming agent, the propylene polymer (A), the elastomeric copolymer (E), the polar ethylene polymer (C) and the bifunctionally unsaturated monomer(s) (D') and/or the multifunctionally unsaturated low molecular weight polymer(s) (D").

In the following the individual components of the cable layer and/or the propylene polymer composition are defined in more detail.

One mandatory requirement of the present invention is the presence of propylene polymer (A) in the propylene polymer composition of the cable layer. The propylene polymer (A) can be a propylene homopolymer (A') or a propylene copolymer (A").

However it is preferred that the propylene polymer (A) is a propylene copolymer (A").

The expression propylene homopolymer used in the instant invention relates to a polypropylene that consists substantially, i.e. of at least 97 wt.-%, preferably of at least 98 wt.-%, more preferably of at least 99 wt.-%, still more preferably of at least 99.8.-wt % of propylene units. In a preferred embodiment only propylene units in the propylene homopolymer are detectable. The comonomer content can be determined with FT infrared spectroscopy, as described below in the examples.

Where the propylene polymer (A) is a propylene copolymer (A"), which is in particular preferred, the propylene copolymer (A") comprises at least one comonomer selected from the group consisting of ethylene and $C_4$ to $C_{20}$ α-olefin, preferably at least one comonomer selected from the group consisting of ethylene and $C_4$ to $C_{10}$ α-olefin, e.g. 1-butene or 1-hexene. Most preferably the propylene copolymer (A") is a propylene ethylene copolymer. The comonomer content, like ethylene content, in the propylene copolymer (A") is in such a case preferably relatively low, i.e. up to 6.0 wt.-%, more preferably 0.5 to 6.0 wt.-%, still more preferably 1.0 to 5.5 wt.-%, yet more preferably 2.0 to 5.0 wt.-%. Particularly the ethylene is the only comonomer in the propylene copolymer (A").

The propylene polymer (A) can be unimodal or multimodal, like bimodal in view of the molecular weight distribution and/or the comonomer content distribution.

The expression "multimodal" or "bimodal" used herein refers to the modality of the polymer, i.e.
the form of its molecular weight distribution curve, which is the graph of the molecular weight fraction as a function of its molecular weight,
or more preferably
the form of its comonomer content distribution curve, which is the graph of the comonomer content as a function of the molecular weight of the polymer fractions.

As will be explained below, the polymer components of the propylene polymer (A) can be produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly the propylene homopolymer (A') may be multimodal or bimodal in view of the molecular weight. In turn the propylene copolymer (A") may be multimodal, like bimodal, in view of the comonomer content and/or molecular weight. It is in particular appreciated that the propylene copolymer (A") is multimodal, like bimodal, in view of the comonomer content.

Further in case the propylene polymer (A) is of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10 wt.-% based on the propylene polymer (A). Accordingly in case of a bimodal system, in particular in view of the comonomer content, the split of the two fractions is roughly 50:50. Thus in a preferred embodiment the propylene polymer (A) comprises two fractions which differ in their comonomer content, like ethylene content, wherein the first fraction is present from 40 to 60 wt.-% and the second fraction from 60 to 40 wt.-%.

The difference of the comonomer content between the two fractions is defined in a way of a preferred embodiment in the following paragraph.

Therefore it is preferred that the propylene polymer (A) is a propylene copolymer (A") with at least two fractions that have different comonomer contents. Even more preferred the propylene copolymer (A") comprises at least two fractions, more preferably consists of two fractions, that have a comonomer content, like ethylene content, which differ of at least 0.8 wt.-%, more preferably differ of at least 1.2 wt.-%. On the other hand the difference in the comonomer content in the two fractions should be not too high, i.e. not higher than 6.0 wt.-%, preferably not higher than 5.0 wt %, to avoid any separation tendencies. Thus it is appreciated that the propylene copolymer (A") comprises at least two fractions, more preferably consists of two fractions, that have comonomer contents which differ of 2.0 to 6.0 wt.-%, more preferably of 2.5 to 5.0 wt.-%. Accordingly in one embodiment the propylene copolymer (A") consists of a first fraction being a propylene homopolymer and a second fraction being a propylene copolymer having a comonomer content, preferably ethylene content, of at least 0.5 wt.-%, more preferably of at least 1.5 wt.-%, like of at least 2.0 wt.-%, e.g. of at least 2.5 wt.-%.

The propylene polymer (A), in particular in case the propylene polymer (A) is the matrix of the heterophasic propylene copolymer (H), may be produced in a polymerization stage effected in one or more polymerization reactors. Desirably the propylene polymer (A), in particular in case the propylene polymer (A) is the matrix of the heterophasic propylene copolymer (H), comprising two or more different propylene polymers may be produced by carrying out polymerization in two or more different polymerisation reactors (e.g. bulk and/or gas phase reactors; as bulk reactors, loop reactors are preferred) whereby to generate polymers of the different desired molecular weight distributions or monomer make ups in the different polymerization reactors.

Further and preferably the propylene polymer (A), in particular the propylene polymer (A) as the matrix of the heterophasic propylene copolymer (H), has a rather low melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as MFR$_2$ (230° C.). Accordingly, it is preferred that in the present invention the propylene polymer (A) has an MFR$_2$ (230° C.) in a range of 0.05 to 10.00 g/10 min, more preferably of 0.50 to 8.00 g/10 min, still more preferably of 0.80 to 5.00 g/10 min. The ranges given apply to a propylene polymer (A) which is not modified due to the bifunctionally unsaturated compounds as defined in the instant invention.

Preferably the propylene polymer (A) is isotactic. Accordingly it is appreciated that the propylene polymer (A) has a rather high pentad concentration, i.e. higher than 80%, more preferably higher than 85%, yet more preferably higher than 90%, still more preferably higher than 92%, still yet more preferably higher than 93%, like higher than 95%.

In case the propylene polymer (A) is a propylene copolymer (A") it is further appreciated that the units derived from C$_2$ to C$_{20}$ α-olefins other than propylene within the propylene copolymer (A") are randomly distributed.

The second requirement of the instant invention is the presence of the elastomeric copolymer (E) in the propylene polymer composition of the cable layer.

The elastomeric copolymer (E) comprises, preferably consists of, units derivable from propylene and at least another α-olefin selected from the group consisting of ethylene and C4 to C20 α-olefin, like C4 to C10 α-olefin, more preferably units derivable from propylene and at least another α-olefin selected form the group consisting of ethylene, 1-butene, 1-pentene, 1-hexene, 1-heptene and 1-octene. Preferably the elastomeric copolymer (E) comprises at least units derivable from propylene and ethylene and may comprise other units derivable from a further α-olefin as defined in this paragraph. However it is in particular preferred that elastomeric copolymer (E) comprises units only derivable from propylene and ethylene. Thus an ethylene-propylene rubber (EPR) as elastomeric copolymer (E) is most preferred.

The content of units derivable from propylene in the elastomeric copolymer (E) is desirably relatively high, i.e. at least 50.0 wt.-% and/or up to 85.0 wt.-%, preferably 55.0 to 85.0 wt.-%, more preferably 60.0 to 80.0 wt.-%. Preferably the elastomeric copolymer (E) is an ethylene-propylene rubber (EPR), in particular with a propylene content as defined in this paragraph.

Like the propylene polymer (A) the elastomeric copolymer (E) can be unimodal or multimodal, like bimodal. However it is preferred that the elastomeric copolymer (E) is unimodal. Concerning the definition of unimodal and multimodal, like bimodal, it is referred to the definition above.

As stated above, the elastomeric copolymer (E) is in particular featured by a relatively high amount of propylene derived units. Relatively high amounts of propylene units are appreciated as similar levels of propylene in the propylene polymer (A) as well as in the elastomeric copolymer (E) reduce the risk of separation tendencies. As the xylene cold soluble fraction (XCS) of the heterophasic propylene copolymer (H) or the mixture of the propylene polymer (A) and the elastomeric copolymer (E) is dominated by the elastomeric copolymer (E) (the xylene cold soluble fraction (XCS) of the propylene polymer (A) is not more than 10 wt.-%, preferably not more than 8.0 wt.-%), it is appreciated that the amount of propylene in the xylene cold soluble fraction (XCS) of the heterophasic propylene copolymer (H) or the mixture of the propylene polymer (A) and the elastomeric copolymer (E), is in the range of 50 to 90 wt.-%, more preferably in the range of 55 to 85 wt.-%. Accordingly the amount of units derivable from other C$_2$ to C$_{20}$ α-olefin(s), i.e. excluding propylene, in the xylene cold soluble fraction (XCS) of the heterophasic propylene copolymer (H) or the mixture of the propylene polymer (A) and the elastomeric copolymer (E), is below 48 wt.-%, more preferably below 42 wt.-%, yet more preferably below 37 wt.-%. Preferred ranges for units derivable from other C$_2$ to C$_{20}$ α-olefin(s), i.e. excluding propylene, in the xylene cold soluble fraction (XCS) of the heterophasic propylene copolymer (H) or the mixture of the propylene polymer (A) and the elastomeric copolymer (E), is 10 to 48 wt.-%, more preferably 15 to 42 wt.-%. The mentioned comonomer values apply in particular in case an elastomeric copolymer (E) is used in which units derivable from ethylene are present. Preferably the elastomeric copolymer (E) is an ethylene-propylene rubber (EPR), in particular with a propylene and/or an ethylene content as defined in this paragraph.

A further important characteristic of the elastomeric copolymer (E) is its intrinsic viscosity. As stated above, the xylene cold soluble fraction (XCS) of the heterophasic propylene copolymer (H) or the mixture of the propylene polymer (A) and the elastomeric copolymer (E) is dominated by the elastomeric copolymer (E). Accordingly the intrinsic viscosity of the elastomeric copolymer (E) is reflected by the intrinsic viscosity of the xylene cold soluble fraction (XCS) of the total the heterophasic propylene copolymer (H) or the total mixture of the propylene polymer (A) and the elastomeric copolymer (E). Thus it is preferred that the intrinsic viscosity of the xylene cold soluble fraction (IV of XCS) of the heterophasic propylene copolymer (H) or the mixture of the propylene polymer (A) and the elastomeric copolymer (E), is equal or below 4.0 dl/g. In a preferred embodiment the intrinsic viscosity is in the range of 1.0 to 4.0 dl/g, still more preferred in the range of 1.5 to 3.5 dl/g. The intrinsic viscosity is measured according to ISO 1628 in decaline at 135° C.

The elastomeric copolymer (E) may be produced by conventional gas phase α-olefin polymerization techniques; however it is preferably produced using a supported catalyst system, e.g. a Ziegler Natta catalyst system or a metallocene catalyst system.

Further it is preferred that the mixture of the propylene polymer (A) and the elastomeric copolymer (E), i.e. the heterophasic propylene copolymer (H), has units derived from C2 to C20 α-olefins other than propylene, preferably derived from ethylene, is more than 7.0 wt.-%, more preferably is more than 10.0 wt.-%, yet more preferably is more than 12.0 wt.-%. Accordingly it is desired that the mixture of the propylene polymer (A) and the elastomeric copolymer (E), i.e. the heterophasic propylene copolymer (H), has units derived from C2 to C20 α-olefins other than propylene, preferably derived from ethylene, is in the range of 5 to 25 wt.-%, preferably in the range of 9 to 21 wt.-%.

Moreover it is appreciated that the MFR$_2$ (230° C.) of the mixture of the propylene polymer (A) and the elastomeric copolymer (E), i.e. the heterophasic propylene copolymer (H), is in a range of 0.05 to 4.00 g/10 min, more preferably of 0.30 to 3.00 g/10 min, still more preferably of 0.40 to 2.00 g/10 min The ranges given apply to a non-modified state due to the bifunctionally unsaturated compounds as defined in the instant invention.

As a further component the present invention requires a further elastomeric substance which can be preferably intimately dispersed within the propylene polymer (A) or within the heterophasic propylene copolymer (H). Such an elastomeric substance is the polar ethylene polymer (C). A polar ethylene polymer (C) according to this invention is in particular an ethylene polymer in which polar comonomers are incorporated. The amount of comonomer units compared to the amount of ethylene units within the polar ethylene polymer is preferably below 50 wt.-%. A preferred lower limit is 10 wt.-%. Accordingly preferred units within the polar ethylene polymer (C) are derived from comonomers selected from the group consisting of alkyl acrylates, like C1 to C8-alkyl acrylates, alkyl methacrylates, like C1 to C8-alkyl methacrylates, acrylic acids, methacrylic acids and vinyl acetate. More preferably the polar units of the polar ethylene polymer (C) are derived from C1 to C8-alkyl acrylate or vinyl acetate. Accordingly ethylene C1 to C8 alkyl acrylate copolymers (C') or ethylene vinyl acetate (EVA) are especially suitable. In case of the ethylene C1 to C8 alkyl acrylate copolymers (C') the polar units are preferably derived from the group consisting of methyl acrylate, ethyl acrylate, and butyl acrylate. In a particular preferred embodiment the ethylene C1 to C8 alkyl acrylate copolymer (C') is an ethylene methyl acrylate (EMA) or an ethylene butyl-acrylate (EBA), the latter being especially preferred.

Moreover it is appreciated that the alkyl acrylate content in the ethylene C1 to C8 alkyl acrylate copolymer (C') is rather high, i.e. is at least 10.0 wt.-%. Thus it is preferred that the alkyl acrylate content in the ethylene C1 to C8 alkyl acrylate copolymer (C') ranges from 10.0 to 45.0 wt.-%, more preferably ranges from 15.0 to 40.0 wt.-%.

Moreover it is appreciated that the ethylene C1 to C8 alkyl acrylate copolymer (C') has a $MFR_2$ (190° C.) in a range of 0.05 to 8.00 g/10 min, more preferably of 0.30 to 6.00 g/10 min, still more preferably of 0.50 to 4.00 g/10 min. The ranges given apply to a non-modified state due to the bifunctionally unsaturated compounds as defined in the instant invention.

The cable layer and/or the propylene polymer composition being not modified due to the bifunctionally unsaturated compounds as defined in the instant invention has preferably an $MFR_2$ (230° C.) in a range of 0.05 to 4.00 g/10 min, more preferably of 0.30 to 3.00 g/10 min, still more preferably of 0.30 to 2.00 g/10 min.

Finally the present invention requires that the propylene polymer composition of the cable layer is modified, i.e. chemically modified, by the use of the bifunctionally unsaturated monomer(s) (D') and/or the multifunctionally unsaturated low molecular weight polymer(s) (D"). Such a modification is desirable to achieve for the inventive propylene polymer composition a specific gel content, i.e. of at least or more than 0.20 wt.-%, and/or a rather high strain hardening value, i.e. a strain hardening $SH_{3.0/2.5}$ (at a Hencky strain rate of 3 $s^{-1}$) of at least 0.5. Without be bonded on this theory the modification may be caused by a chemical linking between the polymer components, as for instance between the components (A) and (E) and/or between the components (A) and (C) and/or between the components (E) and (C) (so called phase coupling). The modification may also be caused by a chemical linking within the elastomeric copolymer (E) and/or within the polar ethylene polymer (C) (so called elastomer cross-linking). Of course also the propylene polymer (A) can be effected by similar modifications. Further the modification may not lead to a linking of two polymer chains but rather lead to the branching of the individual polymer chains. This effect may especially be pronounced in the propylene polymer (A). A suitable chemical modification may be obtained for instance when using thermally decomposing free radical-forming agents without any bifunctionally unsaturated compounds. However in such a case a high risk exists that the polypropylene (A) is degraded, which is detrimental. Thus it is preferred that the modification is accomplished by the use of bifunctionally unsaturated monomer(s) (D') and/or multifunctionally unsaturated low molecular weight polymer(s) (D") as chemically bound bridging unit(s) (D).

"Bifunctionally unsaturated or multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals. The unsaturated sites in the bi- or multifunctionally unsaturated compounds are in their chemically bound state not actually "unsaturated", because the double bonds are each used for a covalent bond to the polymer chains of the propylene polymer (A) and/or the elastomeric copolymers, i.e. the elastomeric copolymer (E) and the polar ethylene polymer (C).

Reaction of the bifunctionally unsaturated monomer(s) (D') and/or multifunctionally unsaturated low molecular weight polymer(s) (D"), preferably having a number average molecular weight $(M_n) \leq 10000$ g/mol, synthesized from one and/or more unsaturated monomers with the whole propylene polymer composition (propylene polymer (A), the elastomeric copolymer (E) and the polar ethylene polymer (C) or with the propylene polymer (A) and the elastomeric copolymer (E) (but without the polar ethylene polymer (C)) may be performed in the presence of a thermally free radical forming agent, e.g. decomposing free radical-forming agent, like a thermally decomposable peroxide and/or ionising radiation or microwave radiation.

The bifunctionally unsaturated monomers may be
  divinyl compounds, such as divinylaniline, m-divinylbenzene, p-divinylbenzene, divinylpentane and divinylpropane;
  allyl compounds, such as allyl acrylate, allyl methacrylate, allyl methyl maleate and allyl vinyl ether;
  dienes, such as 1,3-butadiene, chloroprene, cyclohexadiene, cyclopentadiene, 2,3-dimethylbutadiene, heptadiene, hexadiene, isoprene and 1,4-pentadiene;
  aromatic and/or aliphatic bis(maleimide) bis(citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight $(M_n) \leq 10000$ g/mol may be synthesized from one or more unsaturated monomers.

Examples of such low molecular weight polymers are
  polybutadienes, especially where the different microstructures in the polymer chain, i.e. 1,4-cis, 1,4-trans and 1,2-(vinyl) are predominantly in the 1,2-(vinyl) configuration
  copolymers of butadiene and styrene having 1,2-(vinyl) in the polymer chain.

Preferred low molecular weight polymer is polybutadiene, in particular a polybutadiene having more than 50.0 wt.-% of the butadiene in the 1,2-(vinyl) configuration.

Thus in one embodiment the bifunctionally unsaturated monomer(s) (D') and/or multifunctionally unsaturated low molecular weight polymer(s) (D") are used to treat a mixture of the polypropylene (A) and the elastomeric copolymer (E), i.e. the heterophasic propylene copolymer (H), alone. In another and even more preferred embodiment the bifunctionally unsaturated monomer(s) (D') and/or multifunctionally unsaturated low molecular weight polymer(s) (D") are used to treat a mixture of the polypropylene (A), the elastomeric copolymer (E) and the polar ethylene polymer (C). By treating the polymers of propylene polymer composition of the inventive cable the chemically bound bifunctionally unsaturated monomer(s) (D') and/or multifunctionally unsaturated low molecular weight polymer(s) (D") may act as coupling agent between the propylene polymer (A) and the elastomeric copolymers, i.e. the elastomeric copolymer (E) and the polar ethylene polymer (C), of the dispersed phase or, and more preferably, within the elastomeric copolymer (E) and/or within the polar ethylene polymer (C). It is believed that those molecules, which—with one of their functionalities—are bound to a polymer molecule of the propylene polymer (A) and—with their second or one of their further functionalities—are bound to a polymer molecule belonging to the disperse phase, effect the coupling action. Alternatively and preferably the bifunctionally unsaturated compounds (D') and/or multifunctionally unsaturated low molecular weight compounds (D") bound with one of their functionalities—to a polymer molecule of the elastomeric copolymers, i.e. the elastomeric copolymer (E) and/or the polar ethylene polymer (C), and—with their second or one of their further functionalities—bound to another polymer molecule belonging also to the elastomeric copolymers. It might of course also possible that the bifunctionally unsaturated compounds (D') and/or multifunctionally unsaturated low molecular weight compounds (D") modify in a similar manner polypropylene (A). Additionally it is also possible that the bifunctionally unsaturated compounds (D') and/or multifunctionally unsaturated low molecular weight compounds (D") do not link different polymer chains but lead to a branching of the individual chains.

The polypropylene composition may contain more than one bifunctionally unsaturated monomer (D') and/or multifunctionally unsaturated low molecular weight polymer (D").

As stated above it is preferred that the bifunctionally unsaturated monomer(s) (D') and/or multifunctionally unsaturated low molecular weight polymer(s) (D") are used in the presence of a thermally decomposing free radical-forming agent Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:
Acyl peroxides: benzoyl peroxide, 4-chlorobenzoyl peroxide, 3-methoxybenzoyl peroxide and/or methyl benzoyl peroxide.
Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.
Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate;

or mixtures of these above listed free radical-forming agents.

As mentioned above the cable layer and/or the propylene polymer composition may comprise additionally α-nucleating agents. Such α-nucleating agents are in particular useful for a cable layer according to the third and fourth embodiment as defined herein.

Examples of suitable α-nucleating agents are inorganic additives such as talc, silica or kaolin, salts of monocarboxylic or polycarboxylic acids, e.g. sodium benzoate or aluminum tert-butylbenzoate, dibenzylidenesorbitol or its $C_1$-$C_8$-alkyl-substituted derivatives such as methyldibenzylidenesorbitol, ethyldibenzylidenesorbitol or dimethyldibenzylidenesorbitol or salts of diesters of phosphoric acid, e.g. sodium 2,2'-methylenebis (4,6,-di-tert-butylphenyl) phosphate, vinylcycloalkane polymers and vinylalkane polymers.

Examples of especially suitable α-nucleating agents are selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), nonitol,1,2,3,-trideoxy-4,6:5,7-bis-O-[(4-propylphenyl)methylene]-nonitol, and
(iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer.

Such additives are generally commercially available and are described, for example, in Gachter/Muller, Plastics Additives Handbook, 4th Edition, Hansa Publishers, Munich, 1993.

The nucleating agent content of the cable layer and/or the propylene polymer composition is(are) preferably up to 5 wt.-%. In a preferred embodiment, the cable layer and/or the propylene polymer composition of the present invention contain(s) from 0.01 to 5.0 wt.-%, preferably from 0.02 to 0.50 wt.-%, of a α-nucleating agent, in particular of α-nucleating agent selected from the group consisting of a vinylcycloalkane polymer, a vinylalkane polymer, dibenzylidenesorbitol (e.g. 1,3:2,4 dibenzylidene sorbitol), a dibenzylidenesorbitol derivative, preferably dimethyldibenzylidenesorbitol (e.g. 1,3:2,4 di(methylbenzylidene) sorbitol) and/or nonitol,1,2,3,-trideoxy-4,6:5,7-bis-O-[(4-propylphenyl)methylene]-nonitol.

In case the α-nucleating agents are polymeric α-nucleating agents selected from the group consisting of vinylcycloalkane polymers and vinylalkane polymers, these polymeric nucleating agents are either accomplished by a special reactor technique, where the catalyst is prepolymerised with monomers like e.g. vinylcyclohexane (VCH), or by blending the polypropylene composition with the vinylcycloalkane polymer or vinylalkane polymer. These methods are described in greater detail in e.g. EP 0 316 187 A2 and WO 99/24479 As further characteristic of the inventive cable layer and/or the propylene polymer composition is its/their rather good extensional melt flow properties.

The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as branching or linking, and as such can be far more descriptive with regard to polymer characterization than other types of bulk rheological measurement which apply shear flow.

Thus the cable layer comprising the propylene polymer composition and/or the propylene polymer composition can be alternatively or additionally to the bifunctionally unsaturated compounds further defined by its strain hardening behavior.

Accordingly it is preferred that the cable layer and/or the propylene polymer composition, in particular due to the chemical modification, i.e. due to the use of bifunctionally unsaturated and/or multifunctionally unsaturated compounds, has a rather high strain hardening $SH_{3.0/2.5}$ (at a Hencky strain rate of 3 s$^{-1}$) of at least 0.5, more preferably of at least 0.7, yet more preferably of at least 0.8 and still more preferably of at least 0.9. The exact measuring method is defined in the example section.

Preferably as stated above the cable layer and/or the propylene polymer composition is further and/or alternatively defined by the gel content. The gel content is a good indicator for the chemical modification of the inventive propylene polymer composition. Accordingly the present invention is featured by a gel content of at least or more than 0.20 wt.-%, more preferably of at least 0.23 wt.-%. On the other hand the gel content shall be not too high otherwise other properties are negatively influenced. Thus the gel content is preferably below or not more than 2.00 wt.-%, even more preferred not more than 1.00 wt.-%, still more preferred not more than 0.80 wt.-%, like not more than 0.50 wt.-%. Thus a preferred range for the gel content is 0.20 to 1.50 wt.-%, more preferred 0.23 to 1.0 wt.-%, still more preferably 0.23 to 0.8 wt.-%. The gel content is determined as the relative amount of polymer insoluble in boiling xylene (xylene hot insoluble fraction, XHI).

Further the cable layer and/or the propylene polymer composition can be defined by its degree of branching. A parameter of the degree of branching is the branching index g'. The branching index g' correlates with the amount of branches of a polymer. The branching index g' is defined as g'= $[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17,1301 (1949). This document is herewith included by reference. Thus it is preferred that the branching index g' of the cable layer and/or the propylene polymer composition shall be less than 1.0, more preferably equal or less than 0.9, like equal or less than 0.85. In another preferred embodiment the branching index g' of the cable layer and/or the propylene polymer composition shall be preferably equal or less than 0.8.

Moreover, the inventive cable layer and/or the propylene polymer composition shall preferably further featured by a rather a low melt flow rate (MFR). Thus it is appreciated that the cable layer and/or the propylene polymer composition has a MFR$_2$ (230° C.) of not more than 5.00 g/10 min, preferably in a range of 0.05 to 4.00 g/10 min, more preferably of 0.30 to 3.00 g/10 min, still more preferably of 0.30 to 2.00 g/10 min.

Moreover the cable layer and/or the propylene polymer composition of the instant invention has/have preferably a tensile modulus measured according to ISO 527-1 (cross head speed=50 mm/min) of below 400 MPa, more preferably below 380 MPa and still more preferably below 350 MPa.

Additionally it is preferred that the cable layer and/or the propylene polymer composition of the present invention has a rather high impact strength. Accordingly the inventive polymer composition has an impact strength measured according to the Charpy impact test according to ISO 179 (1eA) at 23° C. of at least 50.0 kJ/m$^2$, more preferably of at least 60.0 kJ/m$^2$, yet more preferably of at least 70.0 kJ/m$^2$, and/or impact strength measured according to the Charpy impact test according to ISO 179 (1eA) at −20° C. of at least 50.0 kJ/m$^2$, more preferably of at least 60.0 kJ/m$^2$. It is in particular appreciated that the cable layer and/or the propylene polymer composition of the present invention has an impact strength measured according to the Charpy impact test according to ISO 179 (1eA) at −20° C. as stated in this paragraph.

It should be additionally mentioned that the propylene polymer composition shall constitute the main part of the cable layer. Accordingly it is appreciated that the cable layer comprises at least 90 wt.-%, more preferably at least 95 wt.-% of the propylene polymer composition as defined in the instant invention. In a preferred embodiment the cable layer consists of the propylene polymer composition as defined in the instant invention.

The present invention is also directed to the use of the propylene polymer composition as defined in the instant invention to improve the stress whitening resistance, i.e. to reach a stress whitening angle of at least 24° at −20° C., more preferably of at least 28° at −20° C., like at least 32° at −20° C., and/or a residual size of blushing immediately after bending of 90° of not more than 4.3 mm, more preferably of not more than 3.2 mm, like not more than 2.8 mm.

The present invention is further directed to the use of the propylene polymer composition as defined in the instant invention as a cable layer, i.e. as a coating layer of one or more conductors.

The present invention is additionally directed to the use of the cable layer as defined herein for cables, in particular for power cables.

Furthermore the present invention defines also cables comprising the cable layer according to the invention. Thus the invention is directed to cables comprising at least one conductor and one or more coating layer(s) wherein at least one coating layer is the cable layer as defined in the instant invention. Preferably such a cable comprises an insulation layer, a semicon and/or a jacketing layer as coating layers. Thus it is preferred that at least one of the insulation layer, the semicon and the jacketing layer is a cable layer of this invention. Even more preferred the insulation layer is a coating layer as defined in the instant invention.

For low voltage applications the cable system shall preferably either consist of one conductor and one insulation layer, or of one conductor, one insulation layer and an additional jacketing layer, or of one conductor, one semiconductive layer and one insulation layer. For medium and high voltage applications it shall preferably consist of one conductor, one inner semiconductive layer, one insulation layer and one outer semiconductive layer, optionally covered additionally by a jacketing layer. The semiconductive layers mentioned consist preferably of a thermoplastic polyolefin composition containing a sufficient amount of electrically conducting solid fillers preferably carbon black. At least one of the layers is the inventive cable layer mentioned above. It is preferred that the insulation layer is the inventive cable layer.

Not only solid fillers can be incorporated into the insulation layer, but also any other additives suitable for insulation layers for cables.

Moreover, not only the insulation layer but also other layers can comprise the composition as defined above. Hence, the inventive cable layer constitutes also the semiconductive layer and/or the jacketing layer.

The final cable can also consist of multiple conductors or cores (normally 1, 2, 3 or 4) combined with single and common insulation layers.

In the following the manufacture of the inventive propylene polymer composition is described.

In general, the process for the manufacture of the inventive propylene polymer composition comprises the steps of (a.1) mixing the propylene polymer (A) and the elastomeric copolymer (E),
(a.2) adding bifunctionally unsaturated monomers (D') and/or multifunctionally unsaturated low molecular weight polymers (D") obtaining a mixture (I),
(a.3) initiating a chemical modification of the mixture (I) obtaining a mixture (II),
(a.4) subsequently adding the polar ethylene polymer (C) to the mixture (II) obtaining a mixture (III) and
(a.5) extruding said mixture (III) to a cable layer or extruding said mixture (III) onto a conductor or conductors and subsequently solidifying (in a water bath) at line speeds of up to 400 m/min, or (b.1) mixing the propylene polymer (A), the elastomeric copolymer (E) and the polar ethylene polymer (C),
(b.2) adding bifunctionally unsaturated monomers (D') and/or multifunctionally unsaturated low molecular weight polymers (D") obtaining a mixture (I),
(b.3) initiating a chemical modification of the mixture (I) obtaining a mixture (II),
(b.4) extruding said mixture (II) to a cable layer or extruding said mixture onto a conductor or conductors and subsequently solidifying (in a water bath) at line speeds of up to 400 m/min.

The α-nucleating agents—if present—are added like known by person skilled in the art, i.e. when the propylene polymer composition is extruded.

Accordingly, the cable layer or the cable in accordance with the present invention may be prepared by compounding the components within suitable melt mixing devices for preparing polymeric compounds, including in particular single screw extruders as well as twin screw extruders. Especially preferred are twin screw extruders including high intensity mixing and kneading sections. Suitable melt temperatures for preparing the compositions are in the range from 170 to 270° C., preferably in the range from 200 to 250° C.

Preferably the propylene polymer (A) and the elastomeric copolymer (E) are first produced to a so called heterophasic propylene copolymer (H).

In such a case the cable layer is produced by the following steps:

(a.1') polymerizing propylene and optionally further comonomer(s) as defined above, preferably ethylene, in at least one reactor, preferably in one or more bulk reactor(s), preferably loop reactor, and/or in one or more gas phase reactor (s), wherein the reactors are typically connected in series, to obtain the propylene polymer (A),
(a.2') transferring said propylene polymer (A) in a further reactor, preferably a gas phase reactor,
(a.3') producing the elastomeric copolymer (E) by polymerizing propylene and further comonomer(s) as defined above, preferably ethylene, in the presence of said propylene polymer (A) to obtain the elastomeric copolymer (E) dispersed in said propylene polymer (A), i.e. leading to a heterophasic mixture,
(a.4') chemically modifying the mixture of step (a.3'), preferably due to bifunctionally unsaturated monomer(s) (D') and/or multifunctionally unsaturated low molecular weight polymer(s) (D"), optionally supported by thermally decomposing free radical-forming agents,
(a.5') mixing said heterophasic mixture with the polar ethylene polymer (C), and
(a.6') extruding said mixture to a cable layer or extruding said mixture onto a conductor or conductors and subsequently solidifying (in a water bath) at line speeds of up to 400 m/min, or (b.1') polymerizing propylene and optionally further comonomer(s) as defined above, preferably ethylene, in at least one reactor, preferably in one or more bulk reactor(s), preferably loop reactor, and/or in one or more gas phase reactor (s), wherein the reactors are typically connected in series, to obtain the propylene polymer (A),
(b.2') transferring said propylene polymer (A) in a further reactor, preferably a gas phase reactor,
(b.3') producing the elastomeric copolymer (E) by polymerizing propylene and further comonomer(s) as defined above, preferably ethylene, in the presence of said propylene polymer (A) to obtain the elastomeric copolymer (E) dispersed in said propylene polymer (A), i.e. leading to a heterophasic mixture,
(b.4') mixing said heterophasic mixture with the polar ethylene polymer (C),
(b.5') chemically modifying the mixture of step (b.4'), preferably due to bifunctionally unsaturated monomer(s) (D') and/or multifunctionally unsaturated low molecular weight polymer(s) (D"), optionally supported by thermally decomposing free radical-forming agents, and
(b.6') extruding said mixture to a cable layer or extruding said mixture onto a conductor or conductors and subsequently solidifying (in a water bath) at line speeds of up to 400 m/min.

All reactors of steps (a.1') to (a.3') or (b.1') to (b.3') are preferably connected in series. The steps (a.4') to (a.6') and (b.4') to (b.6') are carried out in the mixing devices and temperature ranges as defined below.

The polymerization can be carried out in the presence of a metallocene catalyst or Ziegler-Natta-type catalyst, the latter is in particular preferred.

A Ziegler-Natta type catalyst typically used in the present invention for propylene polymerization is a stereospecific, high yield Ziegler-Natta catalyst comprising as essential components Mg, Ti, Al and Cl. These type of catalysts comprise typically in addition to a solid transition metal (like Ti) component a cocatalyst(s) as well external donor(s) as stereoregulating agent.

These compounds may be supported on a particulate support, such as inorganic oxide, like silica or alumina, or, usually, the magnesium halide may form the solid support. It is also possible that solid catalysts are self supported, i.e. the catalysts are not supported on an external support, but are prepared via emulsion-solidification method.

The solid transition metal component usually also comprises an electron donor (internal electron donor). Suitable internal electron donors are, among others, esters of carboxylic acids, like phthalates, citraconates, and succinates. Also oxygen- or nitrogen-containing silicon compounds may be used.

The cocatalyst used in combination with the transition metal compound typically comprises an aluminium alkyl compound. The aluminium alkyl compound is preferably trialkyl aluminium such as trimethylaluminium, triethylaluminium, tri-isobutylaluminium or tri-n-octylaluminium. However, it may also be an alkylaluminium halide, such as diethylaluminium chloride, dimethylaluminium chloride and ethylaluminium sesquichloride.

Preferably the catalyst also comprises an external electron donor. Suitable electron donors known in the art include ethers, ketones, amines, alcohols, phenols, phosphines and silanes. Silane type exernal donors are typically organosilane compounds containing Si—OCOR, Si—OR, or Si—$NR_2$ bonds, having silicon as the central atom, and R is an alkyl, alkenyl, aryl, arylalkyl or cycloalkyl with 1-20 carbon atoms are known in the art.

Examples of suitable catalysts and compounds in catalysts are shown in among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754, WO 03/000755, WO 2004/029112, WO 92/19659, WO 92/19653, WO 92/19658, U.S. Pat. No. 4,382,019, U.S. Pat. No. 4,435,550, U.S. Pat. No. 4,465,782, U.S. Pat. No. 4,473,660, U.S. Pat. No. 4,560,671, U.S. Pat. No. 5,539,067, U.S. Pat. No. 5,618,771, EP45975, EP45976, EP45977, WO 95/32994, U.S. Pat. No. 4,107,414, U.S. Pat. No. 4,186,107, U.S. Pat. No. 4,226,963, U.S. Pat. No. 4,347,160, U.S. Pat. No. 4,472,524, U.S. Pat. No. 4,522,930, U.S. Pat. No. 4,530,912, U.S. Pat. No. 4,532,313, U.S. Pat. No. 4,657,882, U.S. Pat. No. 4,581,342, U.S. Pat. No. 4,657,882.

In the present invention a Ziegler Natta catalyst, e.g. an inorganic halide (e.g. $MgCl_2$) supported titanium catalyst or self supported solid Ziegler Natta catalysts, together with an aluminium alkyl (e.g. triethylaluminium) cocatalyst are preferably employed. Silanes, e.g. dicyclopentanedimethoxysilane (DCPDMS) or cyclohexylmethyldimethoxysilane (CHMDMS), may be typically used as external donors. The catalyst in the second polymerisation stage is typically the same that is used in the first polymerisation stage.

According to a preferred embodiment, the heterophasic propylene copolymer (H) is produced in a reactor system comprising at least one bulk reaction zone including at least one bulk reactor and at least one gas phase reaction zone including at least one gas phase reactor. The polymerization of propylene polymer (A), i.e. the matrix of the heterophasic propylene copolymer (H), is preferably carried out in a loop reactor and in at least one gas phase reactor, i.e. in one or two gas phase reactor(s).

Hydrogen can be used in different amounts as a molar mass modifier or regulator in any or every reactor in the first (polymerization of propylene polymer (A)) and second polymerization stage (polymerization of elastomeric copolymer (E)).

A separation stage can be employed between the reaction zones to prevent the carryover of reactants from the first polymerization stage into the second one.

In addition to the actual polymerization reactors used, the polymerization reaction system can also include a number of additional reactors, such as pre-reactors. The pre-reactors include any reactor for pre-activating and/or pre-polymerizing the catalyst with propylene and/or other α-olefin(s), like ethylene, if necessary. All reactors in the reactor system are preferably arranged in series.

The polar ethylene polymer (C) can be prepared by processes well known in the polymer art using either autoclave or tubular reactors.

The copolymerization can be run as a continuous process in an autoclave. For example, ethylene, a C1 to C8 alkyl acrylate such as methyl acrylate, and optionally a solvent such as methanol (see U.S. Pat. No. 5,028,674) are fed continuously into a stirred autoclave of the type disclosed in U.S. Pat. No. 2,897,183, together with an initiator. The reaction mixture may be continuously removed from the autoclave. After the reaction mixture leaves the reaction vessel, the copolymer may be separated from the unreacted monomers and solvent (if solvent was used) by conventional means, e.g., vaporizing the non-polymerized materials and solvent under reduced pressure and at an elevated temperature. Autoclave acrylate copolymers are for instance available from Voridian under the name EMAC™, from ExxonMobil under the name Optema™, and from Atofina under the name of Lotryl™.

Tubular reactor-produced ethylene C1 to C8 alkyl acrylate copolymer (C') can be distinguished from the more conventional autoclave produced ethylene C1 to C8 alkyl acrylate copolymer (C') as generally known in the art. Thus the term or phrase "tubular reactor produced" ethylene C1 to C8 alkyl acrylate copolymer (C') denotes an ethylene copolymer produced at high pressure and elevated temperature in a tubular reactor or the like. Tubular reactor produced ethylene C1 to C8 alkyl acrylate copolymers (C') of this nature are commercially available from E.I. du Pont de Nemours and Company, Wilmington, Del. (DuPont). The manufacturing of the tubular reactor ethylene C1 to C8 alkyl acrylate copolymers (C') is well known to one skilled in the art such as disclosed in U.S. Pat. No. 3,350,372, U.S. Pat. No. 3,756,996 and U.S. Pat. No. 5,532,066. For additional discussion regarding the differences between tubular reactor produced and autoclave produced ethylene C1 to C8 alkyl acrylate copolymers (C'), see Richard T. Chou, Mimi Y. Keating and Lester J. Hughes, "High Flexibility EMA made from High Pressure Tubular Process", Annual Technical Conference—Society of Plastics Engineers (2002), 60th(Vol. 2), 1832-1836.

Autoclave and tubular reactors can utilize all types of polar copolymers as described above.

The modification of the propylene polymer composition can be for instance effected by dosing the polymer components separately into a twin screw extruder like Prism TSE24 40D with preferably a temperature profile 80/200/210/220/220/230/230/220/225/220° C. and a screw speed of 300 rpm. After heating and melting of the polymer mixture, a solution of the thermally decomposing free radical-forming agent, like tert-butylperoxy isopropyl carbonate, preferably in acetone (10.0 wt.-%) is injected directly into the extruder, achieving a concentration of 0.1 to 3.0 wt.-% of the thermally decomposing free radical-forming agent, based on the mixture. Through a second injection port, the bifunctionally monomer(s) (D') and/or multifunctionally unsaturated low molecular weight polymer(s) (D"), like butadiene, is injected into the same zone of the extruder as the thermally decomposing free radical-forming agent has been added. The polymer melt/liquid/gas mixture is passed through the extruder, then to intensive devolatilisation, discharged and pelletised.

Usual amounts of auxiliary substances, which may range from 0.01 to 2.5 wt.-% of stabilizers, 0.01 to 1 wt.-% of processing aids, 0.1 to 1 wt.-% of antistats, 0.2 to 3 wt.-% of pigments and up to 3 wt.-% of α-nucleating agents, in each case based on the sum of the propylene polymer composition, may be added.

The final propylene polymer composition (preferably in pellet form) is then used to form a cable layer by passing it through an extruder onto a conductor or conductors and subsequently solidifying it (in a water bath) at line speeds of up to 400 m/min.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Isotacticity in Polypropylene by $^{13}$C NMR Spectroscopy

The isotacticity is determined by quantitative $^{13}$C nuclear magnetic resonance (NMR) spectroscopy after basic assignment as e.g. in: V. Busico and R. Cipullo, Progress in Polymer Science, 2001, 26, 443-533. Experimental parameters are adjusted to ensure measurement of quantitative spectra for this specific task as e.g in: S. Berger and S. Braun, 200 and More NMR Experiments: A Practical Course, 2004, Wiley-VCH, Weinheim. Quantities are calculated using simple corrected ratios of the signal integrals of representative sites in a manner known in the art. The isotacticity is determined at the pentad level i.e. mmmm fraction of the pentad distribution.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

MFR$_2$ (230° C.) is measured according to ISO 1133 (230° C., 2.16 kg load).

MFR$_2$ (190° C.) is measured according to ISO 1133 (190° C., 2.16 kg load).

Quantification of Comonomer Content by FTIR Spectroscopy

The comonomer content is determined by quantitative Fourier transform infrared spectroscopy (FTIR) after basic assignment calibrated via quantitative $^{13}$C nuclear magnetic resonance (NMR) spectroscopy in a manner well known in the art. Thin films are pressed to a thickness of between 100-500 µm and spectra recorded in transmission mode. Specifically, the ethylene content of a polypropylene-co-ethylene copolymer is determined using the baseline corrected peak area of the quantitative bands found at 720-722 and 730-733 cm$^{-1}$. Quantitative results are obtained based upon reference to the film thickness.

Quantification of Comonomer Content by $^{13}$C NMR Spectroscopy

The comonomer content is determined by quantitative $^{13}$C nuclear magnetic resonance (NMR) spectroscopy after basic assignment as e.g. in: A. J. Brandolini and D. D. Hills, NMR Spectra of Polymers and Polymer Additives, 2000, Marcel Dekker Inc., New York and U. Wahner et al., Macromolecular Chemistry and Physics, 2003, 204, 1738. Experimental parameters are adjusted to ensure measurement of quantitative spectra for this specific task as e.g in: S. Berger and S. Braun, 200 and More NMR Experiments: A Practical Course, 2004, Wiley-VCH, Weinheim. Quantities are calculated using simple corrected ratios of the signal integrals of representative sites in a manner known in the art.

Intrinsic viscosity is measured according to DIN ISO 1628/1, October 1999 (in Decalin at 135° C.).

Tensile Modulus is evaluated according to ISO 527-1 (cross head speed=1 mm/min; 23° C.) using injection molded specimens as described in EN ISO 294-1 (multipurpose test specimen as described in ISO 527-2).

Charpy impact test: The Charpy notched impact strength (Charpy NIS) is measured according to ISO 179 1eA at 23° C. and −20° C., respectively, using injection molded bar test specimens according to ISO 294-1. The preparation of the compression molded test specimens. was performed according to ISO 293

Crystallization Temperature Tc

Crystallization temperature is determined by differential scanning calorimetry (DSC) measurement according to ISO 11357-1,2,3 at a cooling rate of 10 K/min after a first heating to 200° C.

Melting Temperature Tm

Melting temperature (peak temperature) Tm was measured by DSC according to ISO 11357-1,2,3 in the second heat at a heating rate of 10 K/min.

The xylene solubles (XCS, wt.-%): Content of Xylene solubles (XCS) is determined at 23° C. according ISO 6427.

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.

Amorphous Rubber Fraction of the Xylene Solubles (AM)—Determination of AM

The solution from the second 100 ml flask in the xylene solubles analysis is treated with 200 ml of acetone under vigorous stirring. The precipitate is filtered and dried in a vacuum oven at 90° C.

$$AM \% = (100 \times m_2 \times v_o)/(m_o \times v_1)$$

$m_o$=initial polymer amount (g)
$m_2$=weight of precipitate (g)
$v_o$=initial volume (ml)
$v_1$=volume of analyzed sample (ml)

Strain Hardening Behaviour (Melt Strength):

To characterize the extent of strain hardening of the polymer compositions in the present invention, the rheological properties of the treated and untreated polymers were tested on a standard Physica instrument in combination with a SER—Extensional Rheology System. The measurements were performed at 180° C. and at different Hencky strain rates. The method is described in details in M. Sentmanat et al, "Measuring the transient extensional rheology of polyethylene melts using the SER universal testing platform", J. Rheol. 49 (2005), 585-606. In the present invention, following procedure is applied for carrying out the SER-Extensional experiments:

Experimental Setup

A Paar Physica MCR300, equipped with a TC30 temperature control unit and an oven CTT600 (convection and radiation heating) and a SERVP01-025 extensional device with temperature sensor and a software RHEOPLUS/32 v2.66 is used.

Sample Preparation

Stabilized pellets are compression moulded at 220° C. (gel time 3 min, pressure time 3 min, total moulding time 3+3=6 min) in a mould at a pressure sufficient to avoid bubbles in the specimen, cooled to room temperature and cut to stripes of 0.7 mm thickness to a plate from which stripes of a width of 10 mm and a length of 18 mm are cut.

Check of the SER Device

Because of the low forces acting on samples stretched to thin thicknesses, any essential friction of the device would deteriorate the precision of the results and has to be avoided. In order to make sure that the friction of the device less than a threshold of 5×10−3 mNm (Milli-Newtonmeter) which is required for precise and correct measurements, following check procedure is performed prior to each measurement:

The device is set to test temperature (180° C.) for minimum 30 minutes without sample in presence of the clamps A standard test with $0.3\ s^{-1}$ is performed with the device on test temperature (180° C.)

The torque (measured in mNm) is recorded and plotted against time

The torque must not exceed a value of $5 \times 10^{-3}$ mNm to make sure that the friction of the device is in an acceptably low range Conducting the Experiment The device is heated for min 20 min to the test temperature (180° C. measured with the thermocouple attached to the SER device) with clamps but without sample. Subsequently, the sample (0.7×10×18 mm), prepared as described above, is clamped into the hot device. The sample is allowed to melt for 2 minutes before the experiment is started.

During the stretching experiment under inert atmosphere (nitrogen) at constant Hencky strain rate, the torque is recorded as function of time at isothermal conditions (measured and controlled with the thermocouple attached to the SER device).

After stretching, the device is opened and the stretched film (which is winded on the drums) is inspected. Homogenous extension is required. It can be judged visually from the shape of the stretched film on the drums if the sample stretching has been homogenous or not. The tape must be wound up symmetrically on both drums, but also symmetrically in the upper and lower half of the specimen.

If symmetrical stretching is confirmed, the transient elongational viscosity is calculated from the recorded torque as described in M. Sentmanat et al, "Measuring the transient extensional rheology of polyethylene melts using the SER universal testing platform", J. Rheol. 49 (2005), 585-606.

For the evaluation of the strain hardening, the value $SH_{3.0/2.5}$ is calculated as follow: $SH_{3.0/2.5}=(\log(\eta^e_{3.0})-\log(\eta^e_{2.5}))/(\log(3.0)-\log(2.5))$ where log is Brigg's logarithm, and $\eta^e_{3.0}$ and $\eta^e_{2.5}$ are the elongation viscosities at 3.0 and 2.5% strain respectively. The higher the $SH_{3.0/2.5}$ value, the higher the strain hardening.

Heat Deformation Test (HPT)

The HPT is a modified test of EN 60811-3-1 with regard to temperatures, weights and times. In order to simulate the real cases the following test conditions are selected.

135° C. for 4 hours

Three samples of each material are placed in an oven (135° C./4 hour). A knife with a load of 1447 g is placed on each of the samples. The samples are immediately cooled down after the end of the test and deformation of the sample is measured. The test rig is put in the oven before the testing started so the metal rig has the same temperature as the oven when the samples are put in.

The samples are 10×10×20 mm. The rod in the test rig simulating the cable conductor is taken out of EN 60811-3-1

Electrical Breakdown Strength (EB63%)

The measurement follows standard IEC 60243-part 1 (1988). The method describes a way to measure the electrical breakdown strength for insulation materials on compression molded plaques.

Eb: The electrical field strength in the test sample at which breakdown occurs.

In homogeneous plaques and films this corresponds to the electrical breakdown strength divided by the thickness of the plaque/film (d), unit: kV/mm.

The electrical breakdown strength is determined at 50 Hz within a high voltage cabinet using metal rods as electrodes as described in IEC60243-1 (4.1.2). The voltage is raised over the film/plaque at 2 kV/s until a breakdown occurs.

Cold Bending Test

The cold bending test (cold three point bending test) is carried out on a universal testing machine (Zwick Z010) at 50 mm/min. on compression molded and cut out specimens (80× 10×2 mm).

The experimental set-up consists of the reversed three point bending test coupled with an optical detection system.

The mechanical set up consists of: a fixed part, with a span of 40 mm; a moving part (bending striker), where a light source has been fixed at the bottom and where the optical sensor is fixed on a vertical rod.

This set-up guarantees that the distance between light source and optical sensor remains constant during the test, prerequisite for a good reproducibility of the measurements. Two different parameters are determined:

(a) bending angle at which stress whitening (SW) occurs [°], SW angle. It is correlated with a sharp drop of the optical response during bending (b) residual size of the blushing zones immediately after a bending of 90°. [measured in mm], called Res-SW 90 deg.

The bending angle of stress whitening is determined as follows:

The force deflection and the optical signal deflection curve are recorded. At the beginning of the test, the optical signal is set to 100%. Occurrence of white fracture is correlated with a sharp drop in the optical signal-deflection curve. The initiation of stress whitening is evaluated in the following way:: A tangent is applied to the inflection point of the optical signal-deflection curve (not shown). The intersection of the tangent and the line which denotes the optical signal at 100% is the point where the stress whitening starts. That point determines the stress whitening force and energy and the stress whitening elongation and distance. The latter allows calculating in an automated way the stress whitening angle with the help of trigonometric formulas. Taking a defined specimen geometry and the in earlier tests evaluated distance at 90° C. allows to calculate the angle at the measured distance.

The residual size of a blushing zone after unloading is determined as follows:

Tests are conducted to a deflection corresponding to an angle of 90°.

The specimen is then instantly unloaded (crosshead speed: 400 mm/min) The size of the blushing area is measured immediately after testing using a slide gauge. The obtained value is entered manually in a result sheet; averages are calculated automatically.

Preparation of the Examples

The polypropylene composition CE1 (heterophasic propylene copolymer (H)) was produced in a multistage polymerization process pilot plant consisting of a loop reactor and two gas phase reactors using a Ziegler Natta catalyst prepared according to example 8 of WO 2004/029112, except that diethylaluminium chloride was used as an aluminium compound instead of triethylaluminium. As external donor is used dicyclopentyl dimethoxy silane and TEAL as cocatalyst. In the loop reactor (loop temperature 75° C., loop share of split matrix 50%) and the first gas phase reactor (1.GPR temperature 85° C.), a propylene random copolymer matrix with an ethylene content of 4.1 wt.-% and MFR of 0.90 g/10 min was produced. The polymer matrix was transferred to the second gas phase reactor (2. GPR temperature 80° C.), where an elastomeric ethylene-propylene-copolymer (EPR) was synthesized. The final composition had an MFR value of 0.80 g/10 min, a xylene cold soluble (XCS) value of 27.5 wt.-% and the intrinsic viscosity of AM was 2.5 dl/g. The ethylene content of the XCS part was 32.0 wt.-%. The total ethylene content in the entire composition was 15.5 wt.-%.

EBA copolymer (an ethylene C1 to C8 alkyl acrylate copolymer (C')) is an ethylene-butyl acrylate copolymer with a butyl acrylate content of 17.0 wt-% and a density of 924.5 kg/m$^3$ and MFR$_2$ (190° C., 2.16 kg) of 0.85 g/10 min.

EMA copolymer (an ethylene C1 to C8 alkyl acrylate copolymer (C')) is an ethylene-methyl acrylate copolymer with a methyl acrylate content of 18.0 wt-% and a density of 940 kg/m$^3$ and MFR$_2$ (190° C., 2.16 kg) of 2.00 g/10 min.

The preparation of the comparative examples and the inventive examples was carried out by mixing of the components using the twin screw extruder and processing parameters described on pages 33 and 34. In the inventive examples E 1 to E 3 the chemical modification with the bifunctionally unsaturated monomer was accomplished with CE1 only. In the inventive examples E 4 to E 6 the chemical modification with the bifunctionally unsaturated monomer was accomplished with a mixture of CE1 and an ethylene-butyl acrylate copolymer (EBA). The composition and properties of the examples and comparative examples are summarized in Table 1 to 4. 1,3 butadiene was used as bifunctionally unsaturated monomer and t-butyl peroxy isopropyl carbonate was used as free radical-forming agent. The inventive examples E7, E8 are modified versions of example E5 which include α nucleating agents. The polymeric nucleation agent was prepared as in WO9924479 example 2. In the inventive example E9 the chemical modification with the bifunctionally unsaturated monomer was accomplished with a mixture of CE1 and an ethylene-methyl acrylate copolymer (EMA).

TABLE 1

Modification of soft polypropylene in combination with adding ethylene alkyl-acrylate copolymers

| | Unit | CE 1 | CE 2 | CE 3 | CE 4 | E 1 | E 2 | E 3 |
|---|---|---|---|---|---|---|---|---|
| CE 1 | [wt-%] | 100 | 99.75 | 80 | 80 | 89.75 | 79.75 | 69.75 |
| EBA copolymer | [wt-%] | — | — | 20 | — | 10 | 20 | 30 |
| EMA copolymer | [wt-%] | — | — | — | 20 | — | — | — |
| free radical-forming agent | [wt-%] | — | 0.15 | — | — | 0.15 | 0.15 | 0.15 |
| bifunctionally unsaturated monomer | [wt-%] | — | 0.1 | — | — | 0.1 | 0.1 | 0.1 |
| MFR Value | [g/10 min] | 0.8 | 1.2 | 0.6 | 1.0 | 1.6 | 2.1 | 1.6 |
| Gel content | [wt-%] | 0.00 | 0.26 | 0.13 | 0.15 | 0.25 | 0.23 | 0.26 |
| Tensile Modulus | [MPa] | 465 | 425 | 355 | 342 | 357 | 297 | 276 |
| Impact strength at 23° C. | [kJ/m$^2$] | 94 | 88 | 82 | 84 | 89 | 82 | 81 |
| Impact strength at −20° C. | [kJ/m$^2$] | 8.2 | 10 | 25 | 8 | 12 | 69 | 84 |
| SH$_{3.0/2.5}$ at Hencky strain rate of 3s$^{-1}$ | | break | 0.73 | — | — | — | — | — |
| Electrical breakdown strength EB 63% | [kV/mm] | 83 | 85 | — | — | — | — | 79 |

TABLE 2

Modification of soft polypropylene in combination with adding ethylene alkyl-acrylate copolymers

| | Unit | E 4 | E 5 | E 6 | E 7 | E 8 | E 9 |
|---|---|---|---|---|---|---|---|
| CE 1 | [wt-%] | 89.4 | 79.4 | 69.4 | 77.4 | 79.3 | 79.4 |
| EBA copolymer | [wt-%] | 10 | 20 | 30 | 20 | 20 | 0 |
| EMA copolymer | [wt-%] | 0 | 0 | 0 | 0 | 0 | 20 |
| Polymeric nucleating agent | [wt %] | 0 | 0 | 0 | 2 | 0 | 0 |
| Millad 3988 | [wt %] | 0 | 0 | 0 | 0 | 0.1 | 0 |
| free radical-forming agent | [wt-%] | 0.15 | 0.15 | 0.15 | 0.15 | 0.15 | 0.15 |
| bifunctionally unsaturated monomer | [wt-%] | 0.1 | 0.1 | 0.1 | 0.1 | 0.1 | 0.1 |
| MFR Value | [g/10 min] | 1.5 | 1.1 | 1.1 | 1.1 | 1.1 | 1.0 |
| Gel content | [wt-%] | 0.28 | 0.31 | 0.30 | 0.27 | 0.23 | 0.22 |
| Tensile Modulus | [MPa] | 364 | 313 | 276 | 320 | 349 | 325 |
| Impact strength at 23° C. | [kJ/m$^2$] | 90 | 86 | 80 | 85 | 83 | 83 |
| Impact strength at −20° C. | [kJ/m$^2$] | 11 | 67 | 86 | 62 | 71 | 71 |
| SH$_{3.0/2.5}$ at Hencky strain rate of 3s$^{-1}$ | | 1.26 | 1.30 | 1.03 | — | — | 1.60 |
| Electrical breakdown strength EB 63% | [kV/mm] | 84 | 79 | 80 | 86 | 76 | — |

TABLE 3

Stress whitening resistance

| Parameter | Temperature | | | | |
|---|---|---|---|---|---|
| | 23° C. | | 0° C. | −20° C. | |
| | Res-SW90° | SW-Angle | Res-SW90° | SW-Angle | Res-SW90° |
| Unit | [mm] | [°] | [mm] | [°] | [mm] |
| CE 1 | 0.9 | 29.2 | 3.5 | 15.9 | 4.8 |
| CE 2 | 0.0 | 53.2 | 1.8 | 22.1 | 4.0 |
| CE 3 | 0.2 | 33.8 | 3.5 | 21.4 | 4.0 |
| CE 4 | 0.3 | 40.8 | 2.9 | 24.1 | 4.6 |
| E 1 | 0.0 | 61.9 | 1.1 | 24.6 | 3.5 |
| E 2 | 0.0 | 71.1 | 0.5 | 34.7 | 2.8 |
| E 3 | 0.0 | — | 0.0 | 39.3 | 2.2 |
| E 4 | 0.0 | 52.5 | 1.6 | 24.2 | 4.3 |
| E 5 | 0.0 | 72.9 | 0.2 | 33.0 | 2.8 |
| E 6 | 0.0 | — | 0.0 | 42.3 | 2.1 |
| E 7 | 0.0 | 58.4 | 1.8 | 28.3 | 3.0 |
| E 8 | 0.0 | 50.2 | 1.9 | 24.1 | 3.2 |
| E 9 | 0.0 | — | 0.0 | 37.4 | 2.7 |

TABLE 4

Heat deformation at 135° C.

| Parameter | Deformation |
|---|---|
| Unit | [%] |
| E2 | 8 |
| E5 | 4 |

TABLE 5

DSC melting and crystallization temperature

| Parameter | Melt temp. | Cryst. Temp. |
|---|---|---|
| Unit | ° C. | ° C. |
| CE 1 | 145 | 103 |
| CE 2 | 145 | 104 |
| CE 3 | 145 | 103 |
| CE 4 | 144 | 103 |
| E 1 | 144 | 103 |
| E 2 | 144 | 106 |
| E 3 | 145 | 105 |
| E 4 | 145 | 106 |
| E 5 | 144 | 106 |
| E 6 | 144 | 103 |
| E 7 | 150 | 113 |
| E 8 | 148 | 115 |
| E 9 | 144 | 104 |

We claim:

1. Cable layer comprising a propylene polymer composition comprising
   (a) a polypropylene (A)
   (b) an elastomeric copolymer (E) comprising units derived from
       propylene and
       ethylene and/or C4 to C20 α-olefin and
   (c) a polar ethylene polymer (C)
   wherein
   (i) the polypropylene (A) constitutes a matrix in which the elastomeric copolymer (E) and optionally the polar ethylene polymer (C) is dispersed within the matrix, and
   (ii) the cable layer and/or the propylene polymer composition has a gel content of equal or more than 0.20 wt.-%.

2. Cable layer according to claim 1, wherein said cable layer and/or said composition has a strain hardening $SH_{3.0/2.5}$ (at a Hencky strain rate of 3 $s^{-1}$) of at least 0.5.

3. Cable layer comprising a propylene polymer composition comprising
   (a) a polypropylene (A)
   (b) an elastomeric copolymer (E) comprising units derived from
       propylene and
       ethylene and/or C4 to C20 α-olefin and
   (c) a polar ethylene polymer (C)
   wherein
   (i) the polypropylene (A) constitutes a matrix in which the elastomeric copolymer (E) and optionally the polar ethylene polymer (C) is dispersed within the matrix, and
   (ii) the cable layer and/or the propylene polymer composition has a strain hardening $SH_{3.0/2.5}$ (at a Hencky strain rate of 3 $s^{-1}$) of at least 0.5.

4. Cable layer according to claim 3, wherein said the cable layer and/or the propylene polymer composition has a gel content of equal or more than 0.20 wt.-%.

5. Cable layer according to claim 1, wherein said cable layer and/or said composition is α-nucleated.

6. Cable layer according to claim 1, wherein said cable layer and/or said composition has a branching index g' of less than 1.0.

7. Cable layer according to claim 3, wherein said cable layer and/or said composition has a gel content of equal or below 1.00 wt.-%.

8. Cable layer according to claim 1, wherein said composition comprises additionally units (D) derived from at least bifunctionally unsaturated monomer(s) (D') and/or at least multifunctionally unsaturated low molecular weight polymer(s) (D").

9. Cable layer according to claim 8, wherein
   (a) the polypropylene (A) and/or the elastomeric copolymer (E) but not the polar ethylene polymer (C)
   or
   (b) the polypropylene (A), the elastomeric copolymer (E) and the polar ethylene polymer (C)
   are chemically modified due to the bifunctionally unsaturated monomer(s) (D') and/or the multifunctionally unsaturated low molecular weight polymer(s) (D").

10. Cable layer according to claim 1, wherein the cable layer and/or the propylene polymer comprises
    (a) at least 36.0 wt.-% of polypropylene (A),
    (b) not more than 50.0 wt.-% of the elastomeric copolymer (E), and
    (c) at least 10.0 wt.-% of the polar ethylene polymer (C),
        wherein the percentages are based on the total amount of the cable layer.

11. Cable layer according to claim 1, wherein the polypropylene (A) is a propylene copolymer (A") comprising units derived from
    (i) propylene and
    (ii) selected from the group consisting of ethylene and C4 α-olefin, C5 α-olefin, C6 α-olefin, C7 α-olefin, C8 α-olefin, C9 α-olefin, C10 α-olefin, C11 α-olefin, C12 α-olefin, C13 α-olefin, C14 α-olefin, C15 α-olefin, C16 α-olefin, C17 α-olefin, C18 α-olefin, C19 α-olefin, C20 α-olefin and mixtures thereof,
    and wherein the amount of units derived from (ii) is not more than 8.0 wt.-% within the propylene polymer (A).

12. Cable layer according to claim 1, wherein the amount of units derived from propylene in the xylene cold soluble fraction (XCS) of the mixture of the polypropylene (A) and the elastomeric copolymer (E) is at least 50 wt.-%.

13. Cable layer according to claim 1, wherein the intrinsic viscosity of the xylene cold soluble fraction (XCS) of the mixture of the polypropylene (A) and the elastomeric copolymer (E) is in the range of 1.0 to 4.0 dl/g.

14. Cable layer according to claim 1, wherein the polar ethylene polymer (C) is an ethylene C1 to C8 alkyl acrylate copolymer (C').

15. Cable layer according to claim 14, wherein the alkyl acrylate content in the ethylene C1 to C8 alkyl acrylate copolymer (C') is at least 10.0 wt.-%.

16. Cable layer according to claim 8, wherein the bifunctionally unsaturated monomers used for the units (D) are selected from the group consisting of divinyl compounds, allyl compounds and dienes.

17. Cable layer according to claim 1, wherein the cable layer comprises at least 90 wt.-% of the propylene polymer composition.

18. Cable layer according to claim 3, wherein the propylene polymer composition forms a stress whitening resistance to reach a stress whitening angle of at least 24° at −20° C.

19. Cable layer according to claim 1, which is formed into cables.

20. Cable comprising,
   at least one conductor,
   at least one coating layer(s), wherein at least one coating layer is a cable layer comprising a propylene polymer composition comprising
   (a) a polypropylene (A)
   (b) an elastomeric copolymer (E) comprising units derived from
      propylene and
      ethylene and/or C4 to C20 α-olefin and
   (c) a polar ethylene polymer (C)
   wherein
   (i) the polypropylene (A) constitutes a matrix in which the elastomeric copolymer (E) and optionally the polar ethylene polymer (C) is dispersed within the matrix, and
   (ii) the cable layer and/or the propylene polymer composition has a gel content of equal or more than 0.20 wt.-%.

21. A cable layer according to claim 8 manufactured by the process comprising the steps
   (a.1) mixing the propylene polymer (A) and the elastomeric copolymer (E),
   (a.2) adding bifunctionally unsaturated monomers (D') and/or multifunctionally unsaturated low molecular weight polymers (D") obtaining a mixture (I),
   (a.3) initiating a chemical modification of the mixture (I) obtaining a mixture (II),
   (a.4) subsequently adding the polar ethylene polymer (C) to the mixture (II) obtaining a mixture (III) and
   (a.5) extruding said mixture (III) to a cable layer or extruding said mixture (III) onto a conductor or conductors and subsequently solidifying (in a water bath) at line speeds of up to 400 m/min,
   or
   (b.1) mixing the propylene polymer (A), the elastomeric copolymer (E) and the polar ethylene polymer (C),
   (b.2) adding bifunctionally unsaturated monomers (D') and/or multifunctionally unsaturated low molecular weight polymers (D") obtaining a mixture (I),
   (b.3) initiating a chemical modification of the mixture (I) obtaining a mixture (II),
   (b.4) extruding said mixture (II) to a cable layer or extruding said mixture onto a conductor or conductors and subsequently solidifying (in a water bath) at line speeds of up to 400 m/min.

22. Cable layer according to claim 21, wherein step (a.2) or (b.2) is carried out by using a thermally decomposing free radical-forming agent.

23. Cable layer according to claim 21, wherein the propylene polymer composition is α-nucleated by adding an α-nucleating agent.

24. Cable layer according to claim 3, wherein the cable layer and/or the propylene polymer comprises
   (a) at least 36.0 wt.-% of polypropylene (A),
   (b) not more than 50.0 wt.-% of the elastomeric copolymer (E), and
   (c) at least 10.0 wt.-% of the polar ethylene polymer (C),
      wherein the percentages are based on the total amount of the propylene polymer composition.

25. Cable layer according to claim 1, wherein the polar ethylene polymer (C) is selected from the group consisting of ethylene butyl-acrylate (EBA) and ethylene methyl-acrylate (EMA).

* * * * *